United States Patent
Lee

(10) Patent No.: US 11,983,781 B2
(45) Date of Patent: May 14, 2024

(54) METHOD AND SYSTEM FOR PRODUCING, ORDERING, AND DELIVERING CONSUMER-CUSTOMIZED CAKES USING FOOD PRINTER CAPABLE OF PHOTOGRAPHING PRINTOUT

(71) Applicant: LSB CO., LTD., Gumi-si (KR)

(72) Inventor: Sanhong Lee, Gumi-si (KR)

(73) Assignee: LSB CO., LTD., Gumi-si (KR)

( * ) Notice: Subject to any disclaimer, the term of this patent is extended or adjusted under 35 U.S.C. 154(b) by 617 days.

(21) Appl. No.: 17/121,046

(22) Filed: Dec. 14, 2020

(65) Prior Publication Data
US 2022/0164490 A1   May 26, 2022

(30) Foreign Application Priority Data
Nov. 20, 2020   (KR) .................. 10-2020-0156436

(51) Int. Cl.
   *G06Q 50/04* (2012.01)
   *A21C 15/00* (2006.01)
   (Continued)

(52) U.S. Cl.
   CPC ........... *G06Q 50/04* (2013.01); *A21C 15/002* (2013.01); *A23P 20/20* (2016.08); *G06F 3/0482* (2013.01);
   (Continued)

(58) Field of Classification Search
   CPC .............. G06Q 50/04; G06Q 30/0621; G06Q 30/0643; A23P 20/20; A23P 20/253
   See application file for complete search history.

(56) References Cited

U.S. PATENT DOCUMENTS

| 4,910,661 A | * | 3/1990 | Barth ................ A21C 15/002 700/66 |
| 5,505,775 A | * | 4/1996 | Kitos ................ A21C 15/002 426/104 |

(Continued)

FOREIGN PATENT DOCUMENTS

| JP | 2003208532 A | 7/2003 |
| KR | 20050093581 A | 9/2005 |

(Continued)

OTHER PUBLICATIONS

'Cakerator' struggles with pricing for time spent. Green Bay Press Gazette [Green Bay, Wis] Apr. 30, 2019: A.1 (Year: 2019).*

(Continued)

*Primary Examiner* — Michael Misiaszek
(74) *Attorney, Agent, or Firm* — STIP Law Group, LLC

(57) ABSTRACT

Provided is a method of ordering a consumer-customized cake using a cake ordering system, including transmitting, to a management server, a cake image selected among a plurality of displayed cake images, transmitting, to the management server, a cake image selected among a plurality of displayed cake images, receiving, from the management server, a cake model matched with the selected cake image and a decoration model matched with the selected cake image and displaying the cake model and the decoration model, placing the decoration model on the cake model in response to selection for a movement of the decoration model and transmitting, to the management server, location information of the decoration model on the cake model, receiving, from the management server, a decoration cake model which is a composite model of the cake model and the decoration model based on the location information of the decoration model on the cake model, and receiving delivery information to which a cake on which decorations have been shaped by a food printer that receives food printer model (Continued)

data for the decoration model is to be reached, and transmitting the delivery information to the management server.

6 Claims, 29 Drawing Sheets

(51) Int. Cl.
| | | |
|---|---|---|
| *A23P 20/20* | (2016.01) | |
| *A23P 20/25* | (2016.01) | |
| *G06F 3/0482* | (2013.01) | |
| *G06F 3/04845* | (2022.01) | |
| *G06Q 10/083* | (2023.01) | |
| *G06Q 30/0601* | (2023.01) | |
| *G06F 3/04815* | (2022.01) | |
| *G06F 3/04883* | (2022.01) | |

(52) U.S. Cl.
CPC ....... *G06F 3/04845* (2013.01); *G06Q 10/083* (2013.01); *G06Q 30/0621* (2013.01); *G06Q 30/0643* (2013.01); *A23P 2020/253* (2016.08); *G06F 3/04815* (2013.01); *G06F 3/04883* (2013.01)

(56) References Cited

U.S. PATENT DOCUMENTS

| | | | | |
|---|---|---|---|---|
| 2002/0095231 | A1* | 7/2002 | Yu | G06Q 30/06 700/97 |
| 2010/0315491 | A1* | 12/2010 | Carter | G03B 15/10 348/789 |
| 2014/0176608 | A1* | 6/2014 | Boysen | H04N 1/00127 345/633 |
| 2016/0257051 | A1* | 9/2016 | Pappas | B29C 48/2888 |
| 2018/0121842 | A1* | 5/2018 | Castle | G06Q 50/12 |
| 2020/0184530 | A1* | 6/2020 | Anderson | G06Q 30/0641 |

FOREIGN PATENT DOCUMENTS

| | | |
|---|---|---|
| KR | 20150124477 A | 11/2015 |
| KR | 101620963 B1 | 5/2016 |

OTHER PUBLICATIONS

Firms reaching online potential during Covid-19. The Sligo Champion [Sligo] Apr. 24, 2020. (Year: 2020).*
Building a better bakery: Using technology to gain customers and efficiencies. Buffington, Steven. Supermarket News Informa. (Apr. 17, 2015) (Year: 2015).*
A multifactor model for digital innovation in allergy-free food retailing. Westerlund, Mika; Rajala, Risto; Isabelle, Diane A; Leminen, Seppo; Basbaih, Reem; et al. ISPIM Conference Proceedings: 1-14. Manchester: The International Society for Professional Innovation Management (ISPIM). (2019) (Year: 2019).*

* cited by examiner

[FIG. 1A]
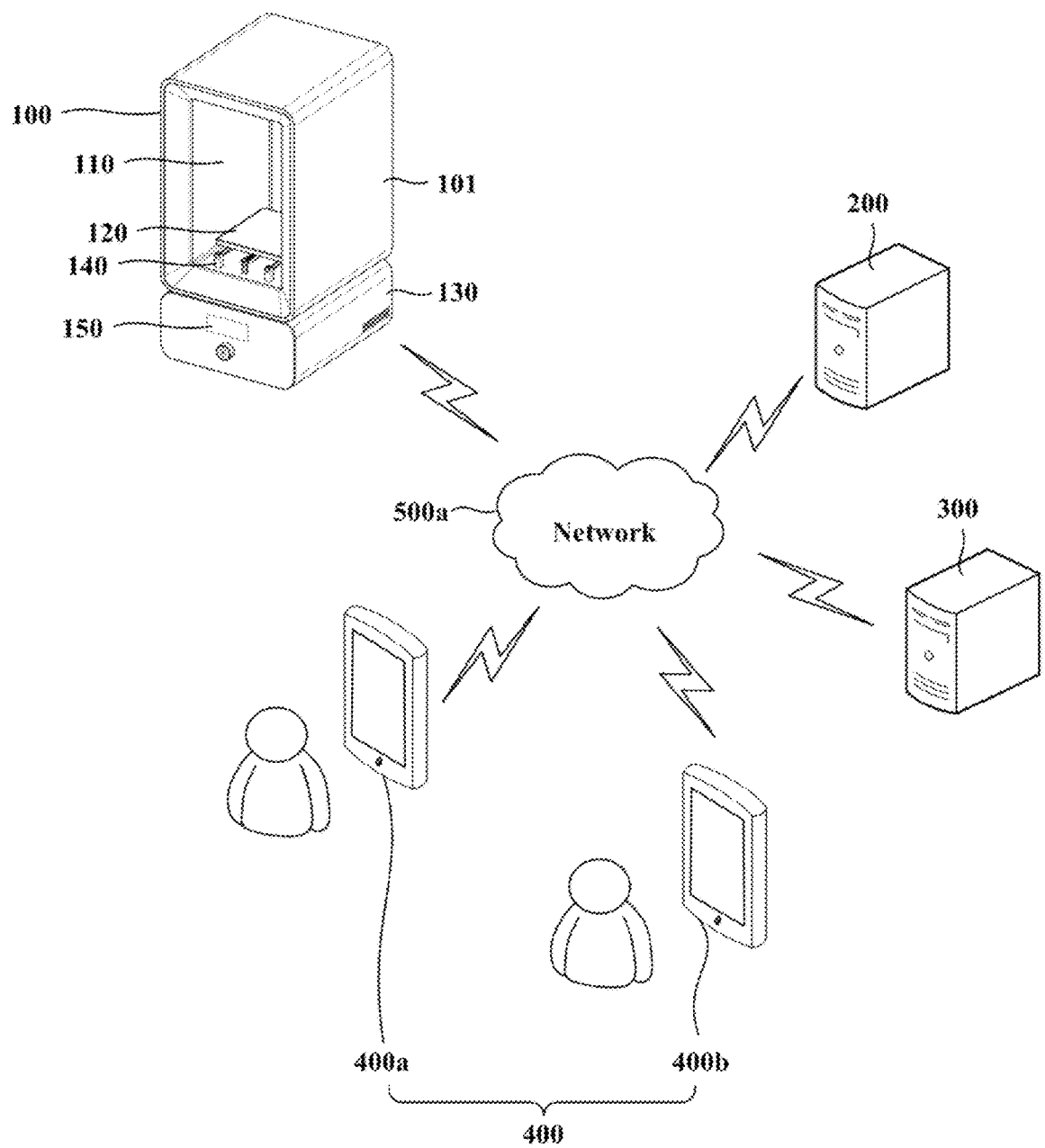

[FIG. 1B]
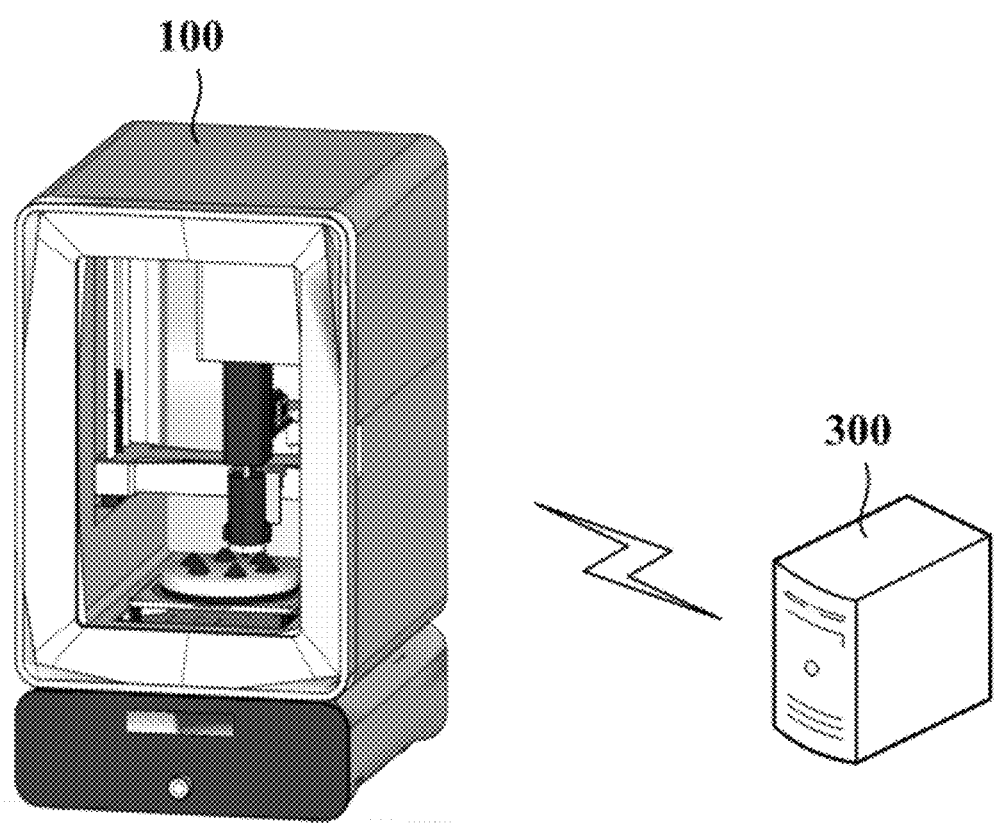

[FIG. 2]
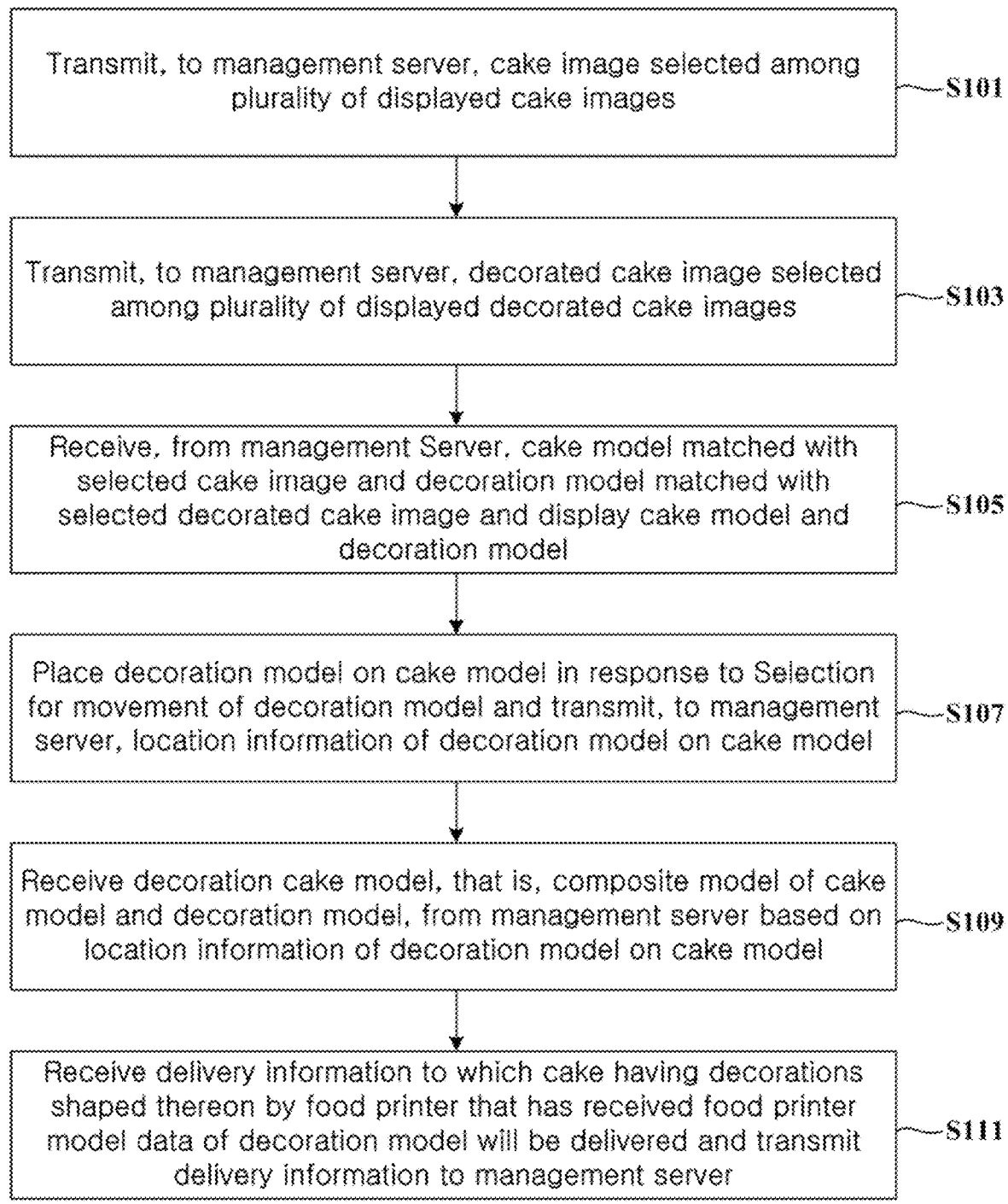

[FIG. 3]
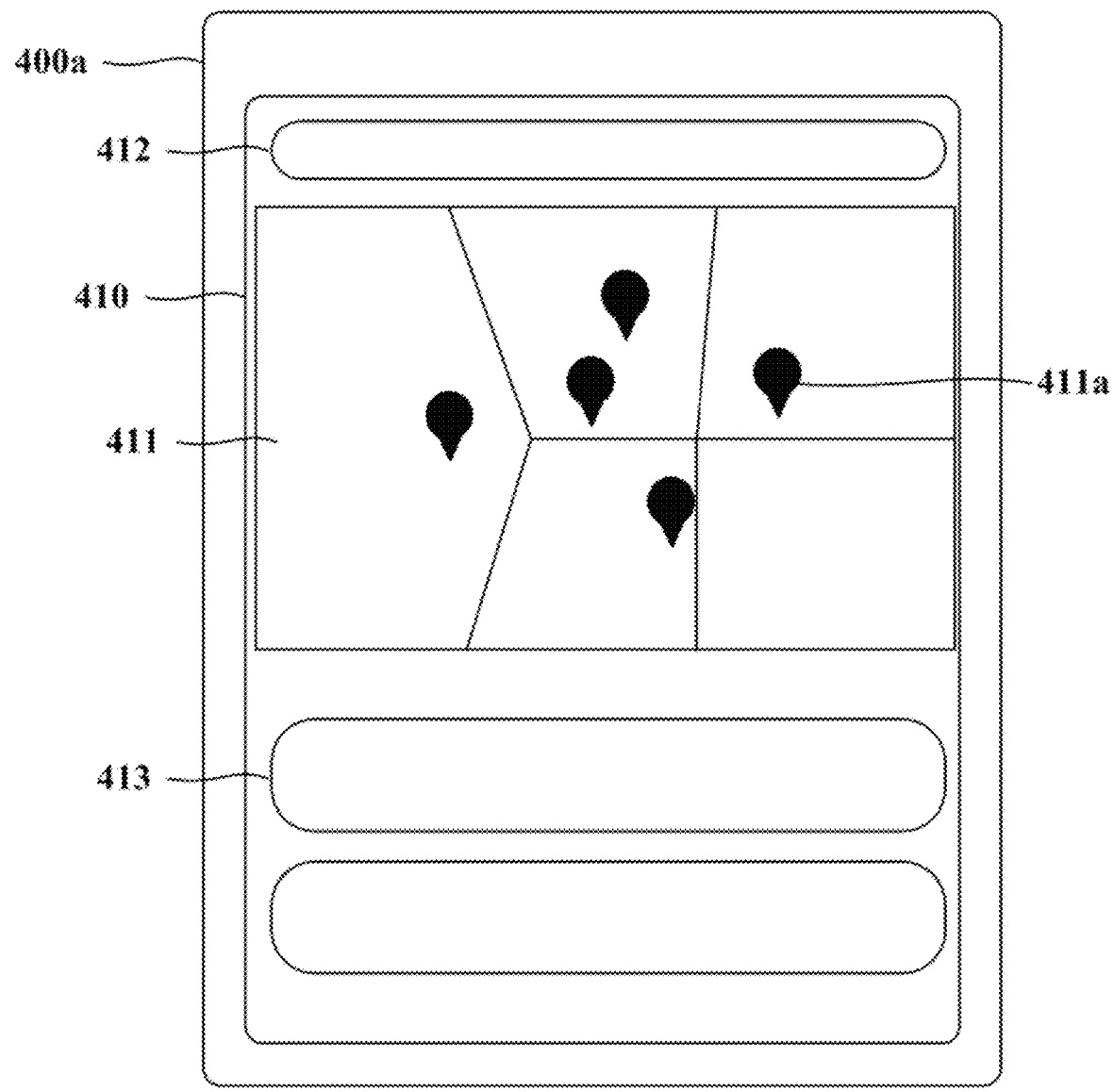

[FIG. 4]
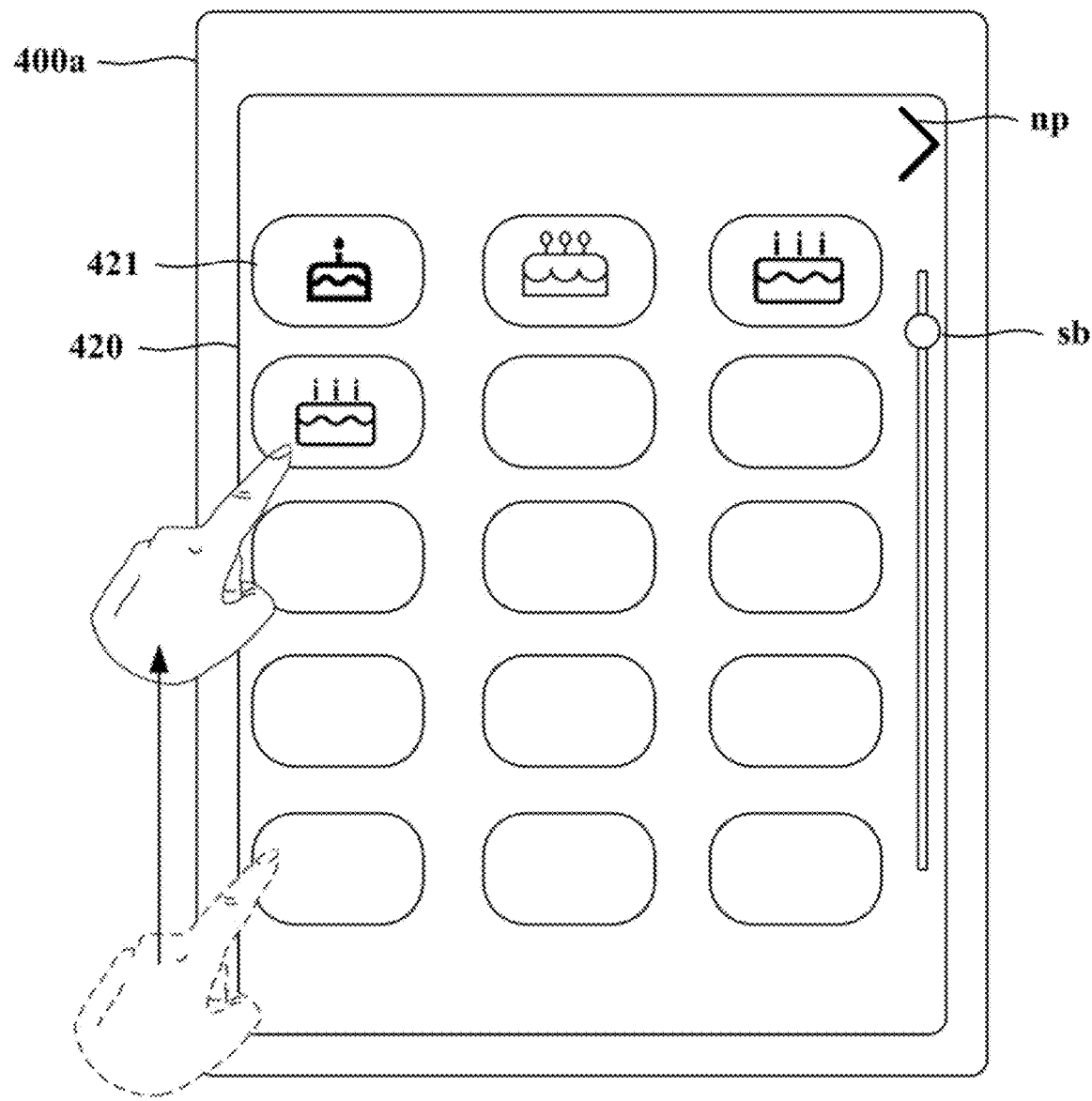

[FIG. 5]
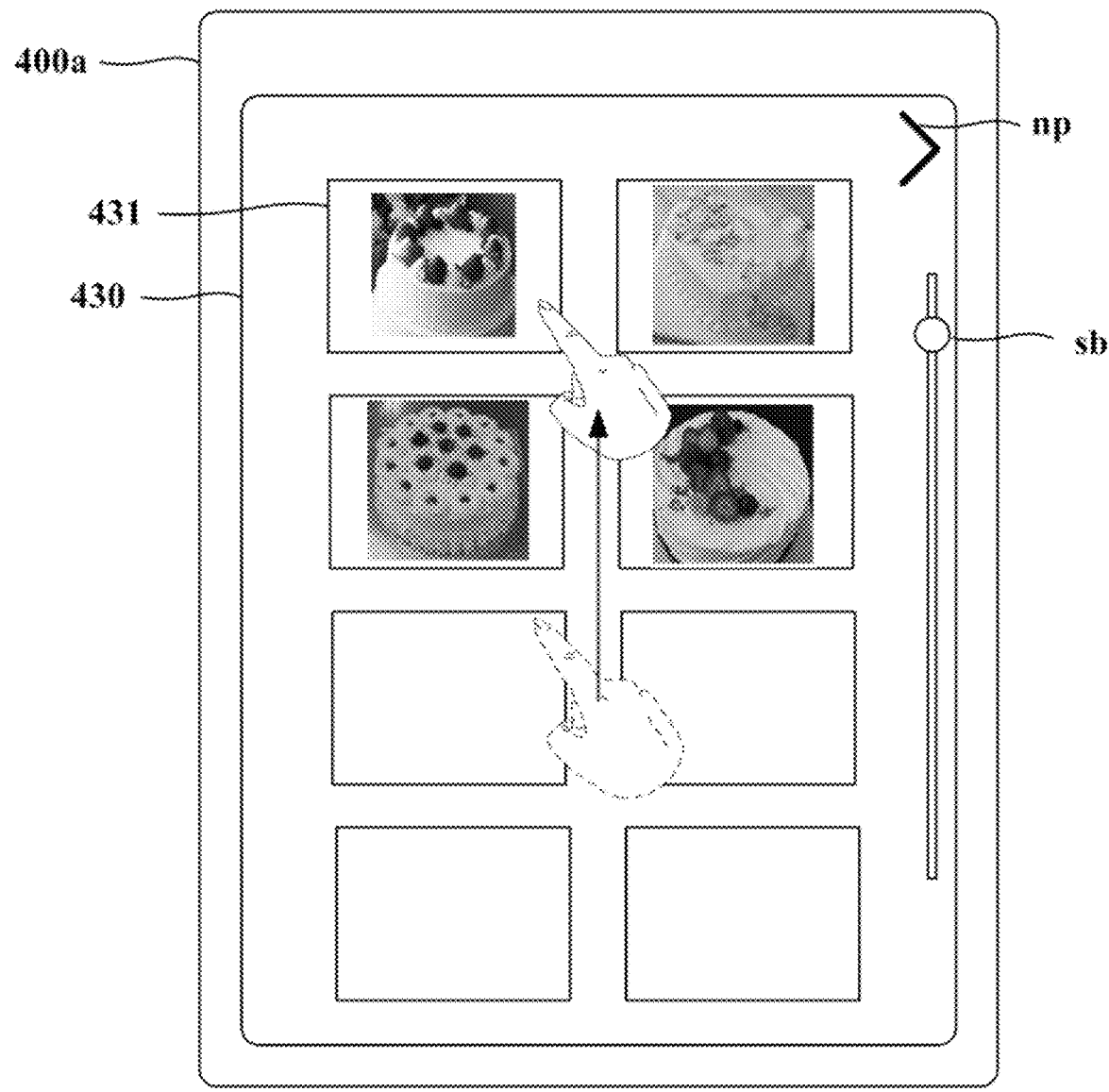

[FIG. 6]
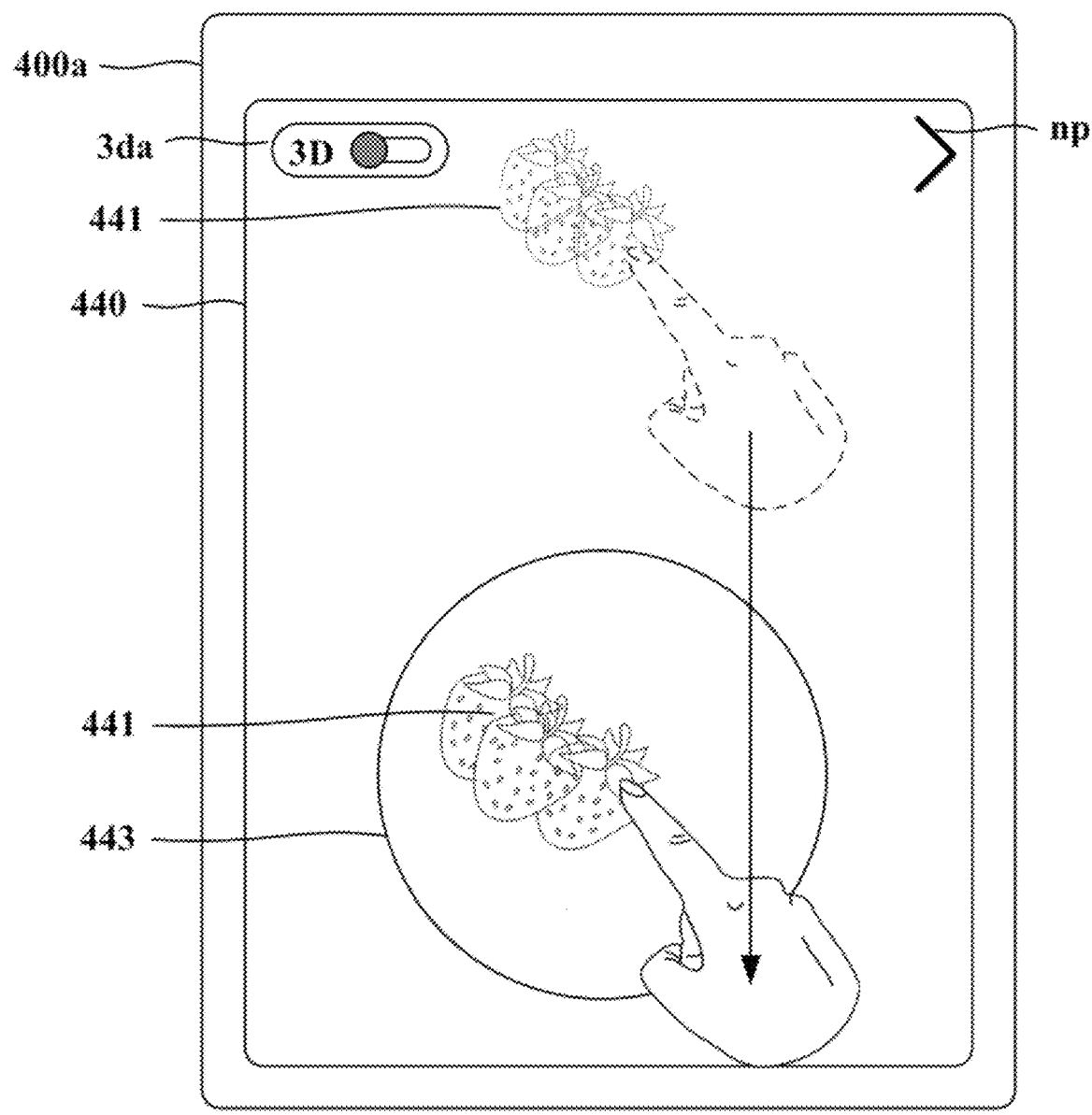

[FIG. 7]
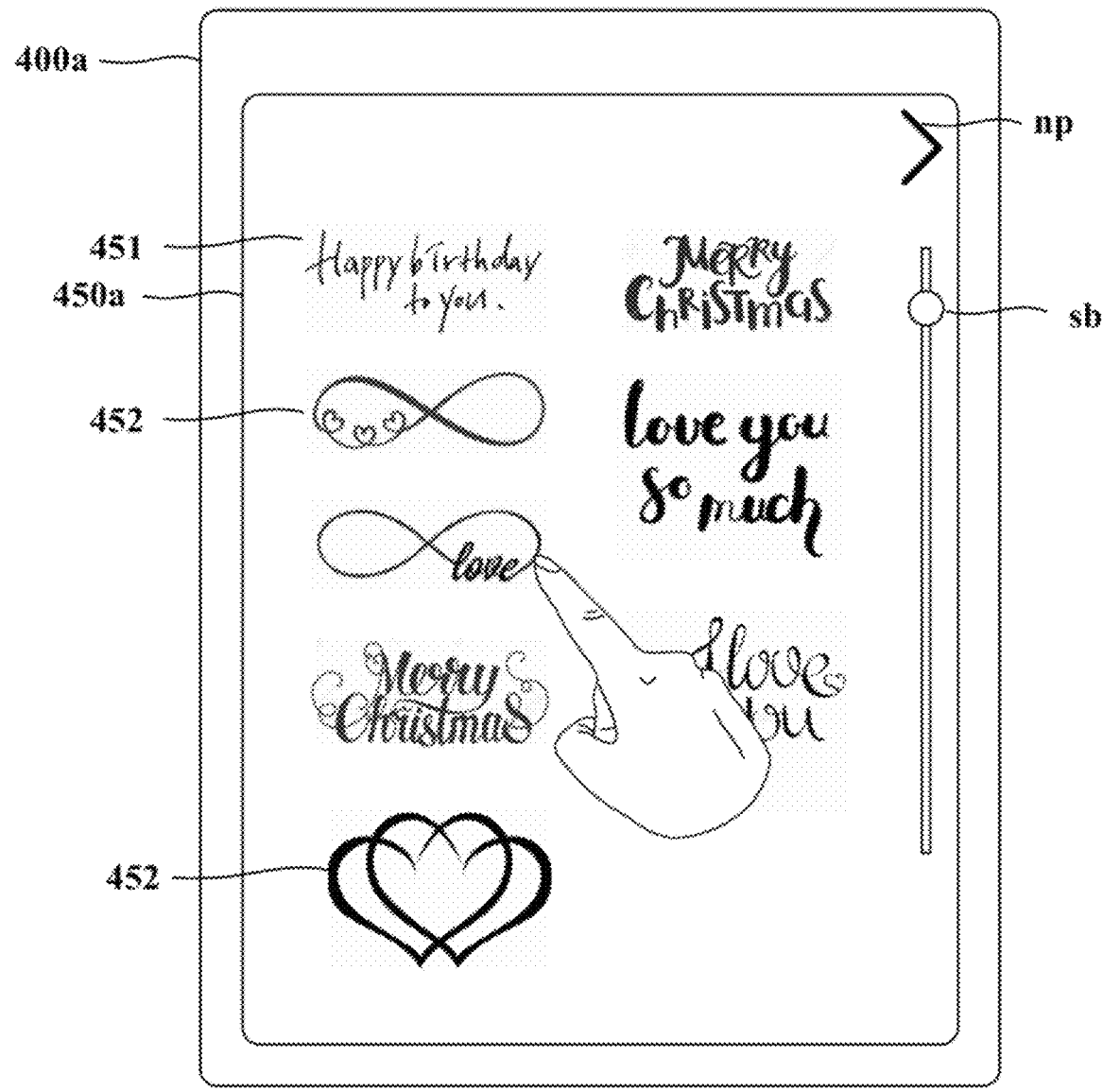

[FIG. 8]
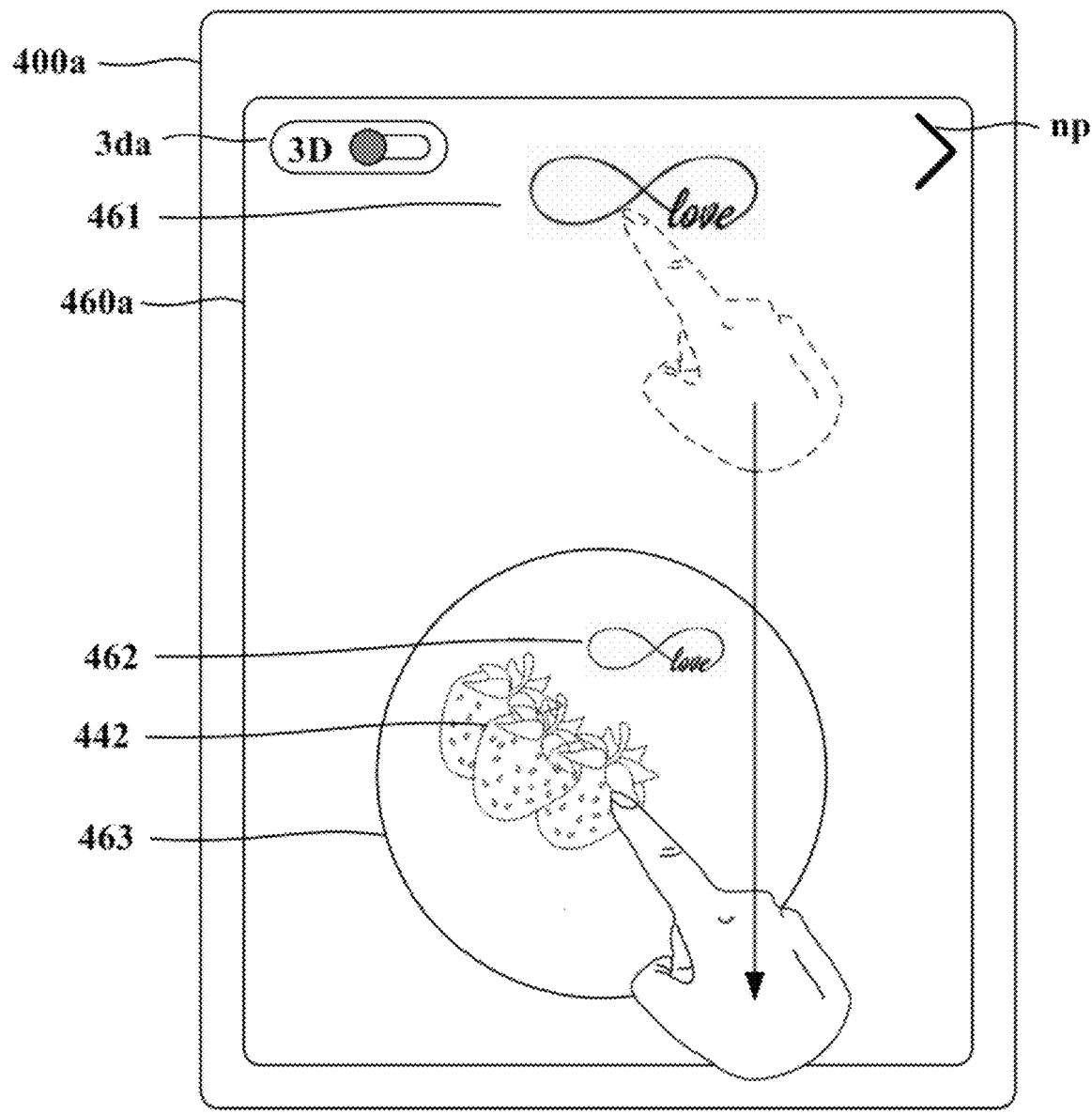

[FIG. 9]
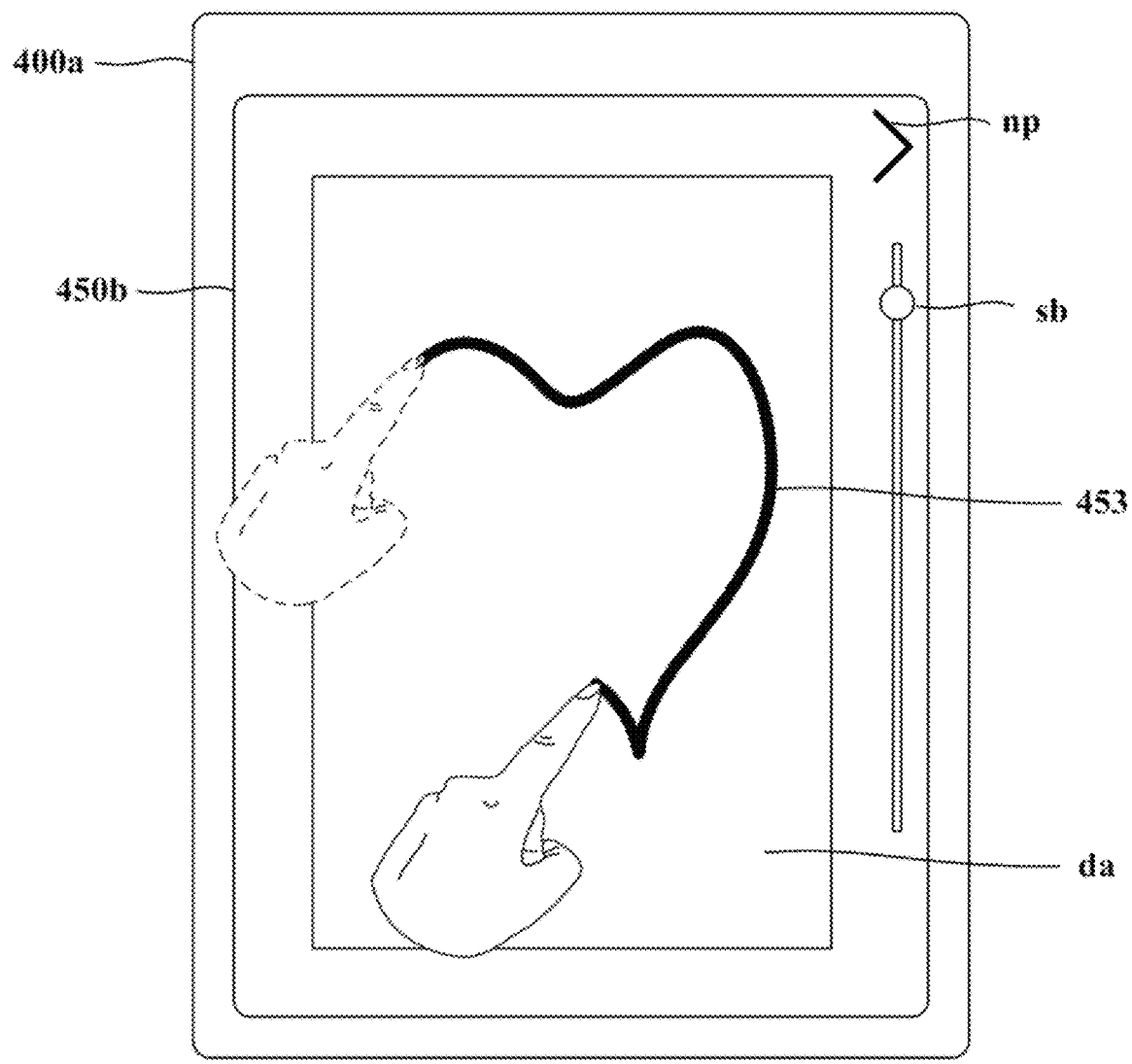

[FIG. 10]
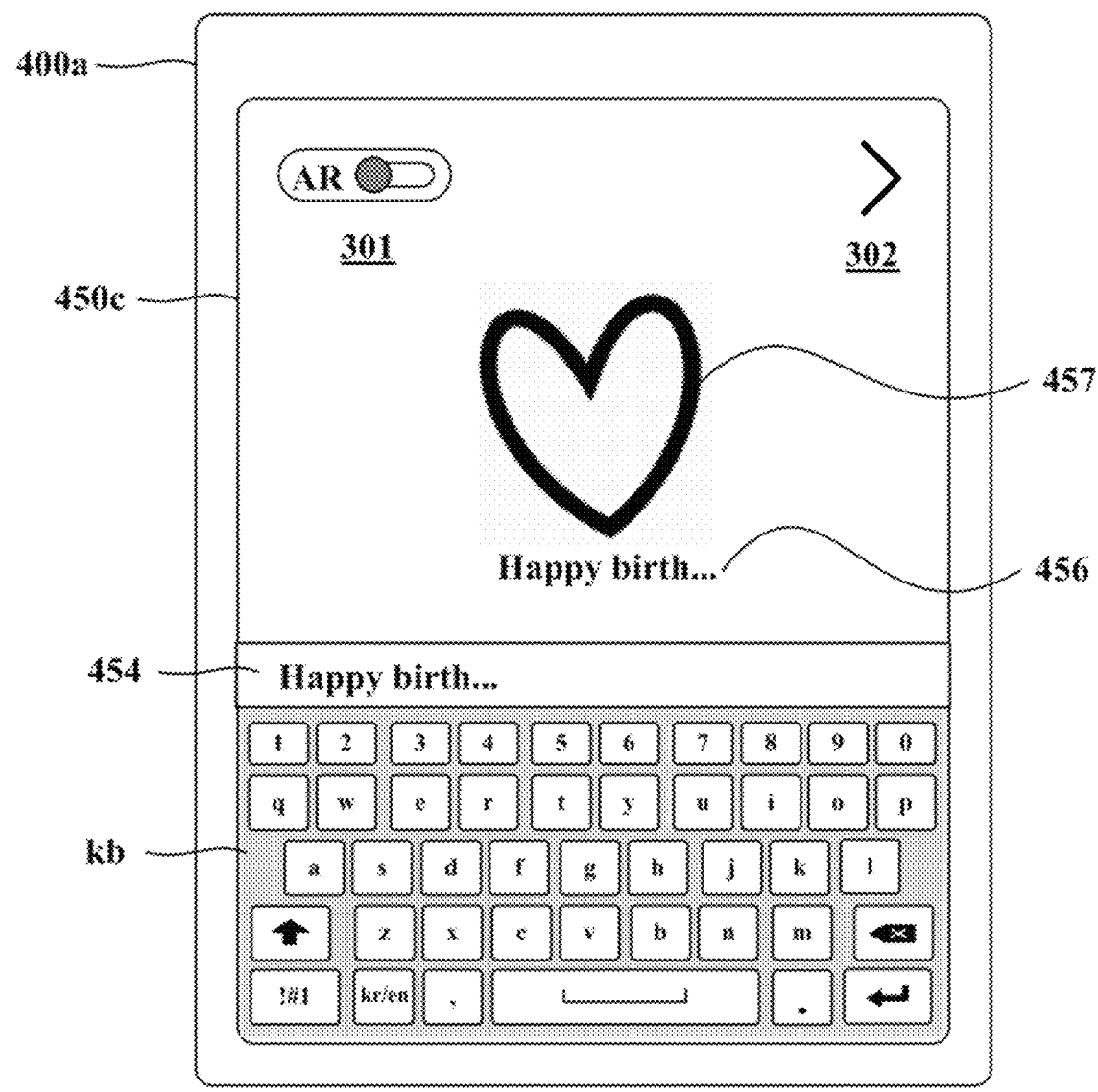

[FIG. 11]
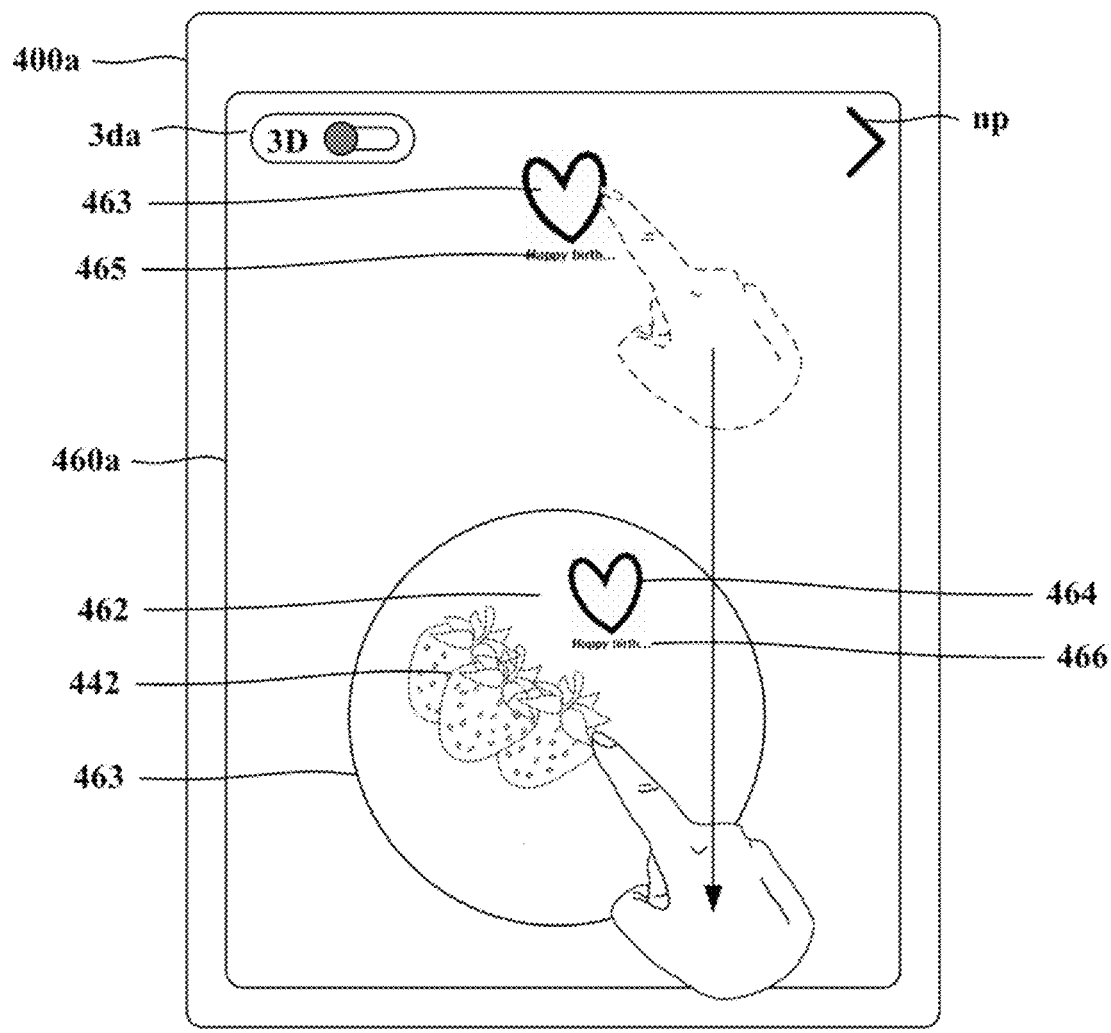

[FIG. 12]
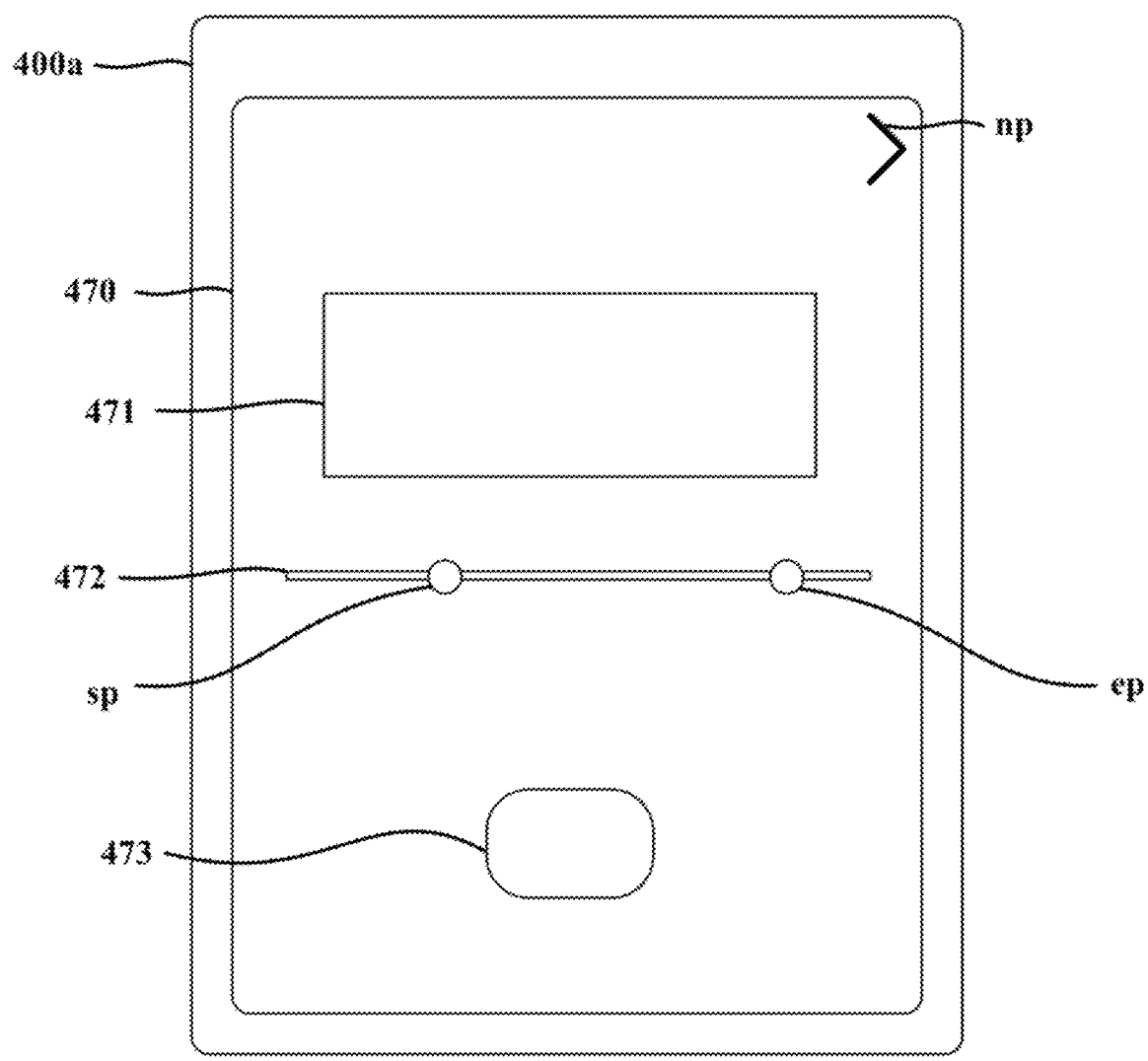

[FIG. 13]
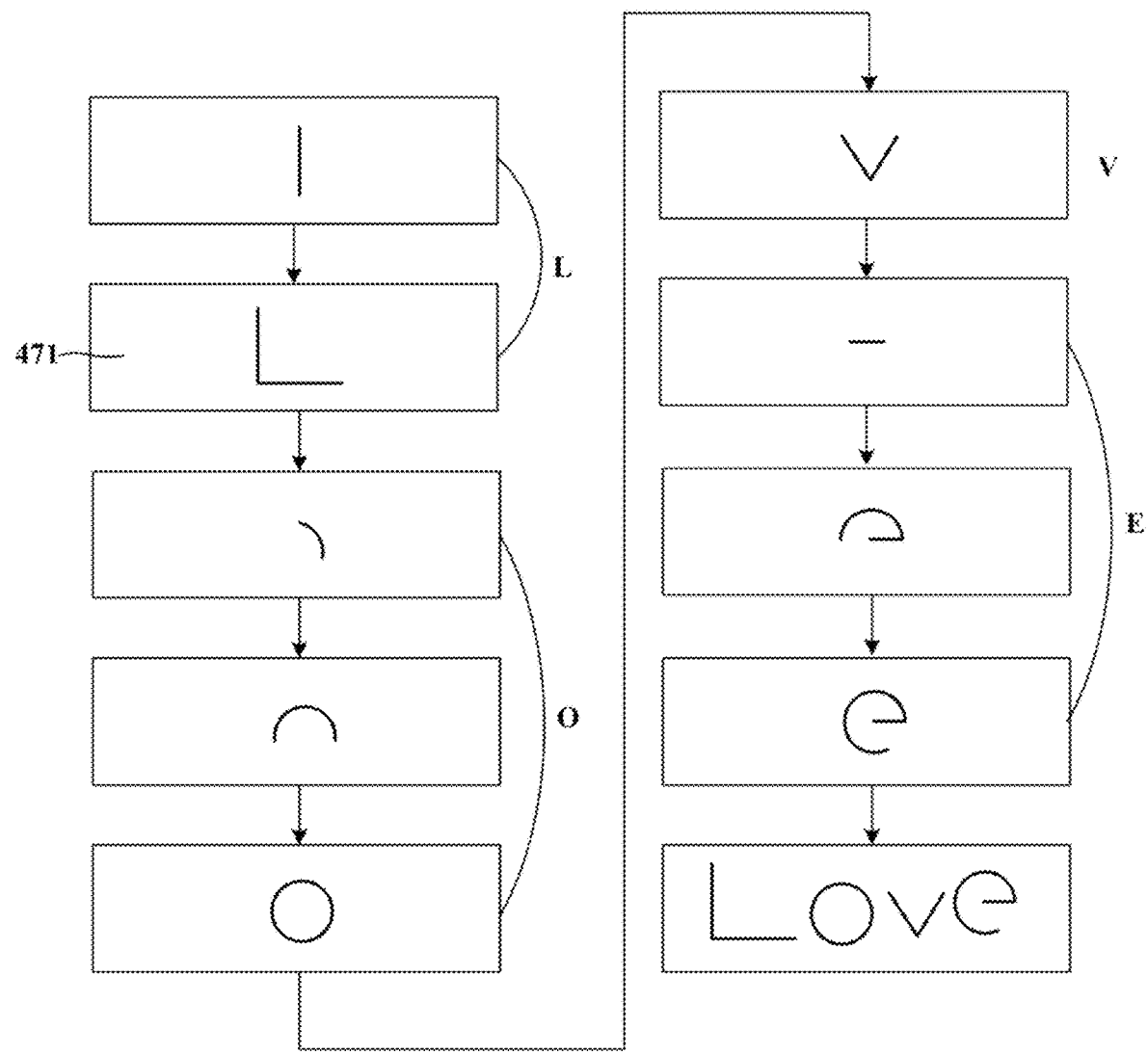

[FIG. 14]
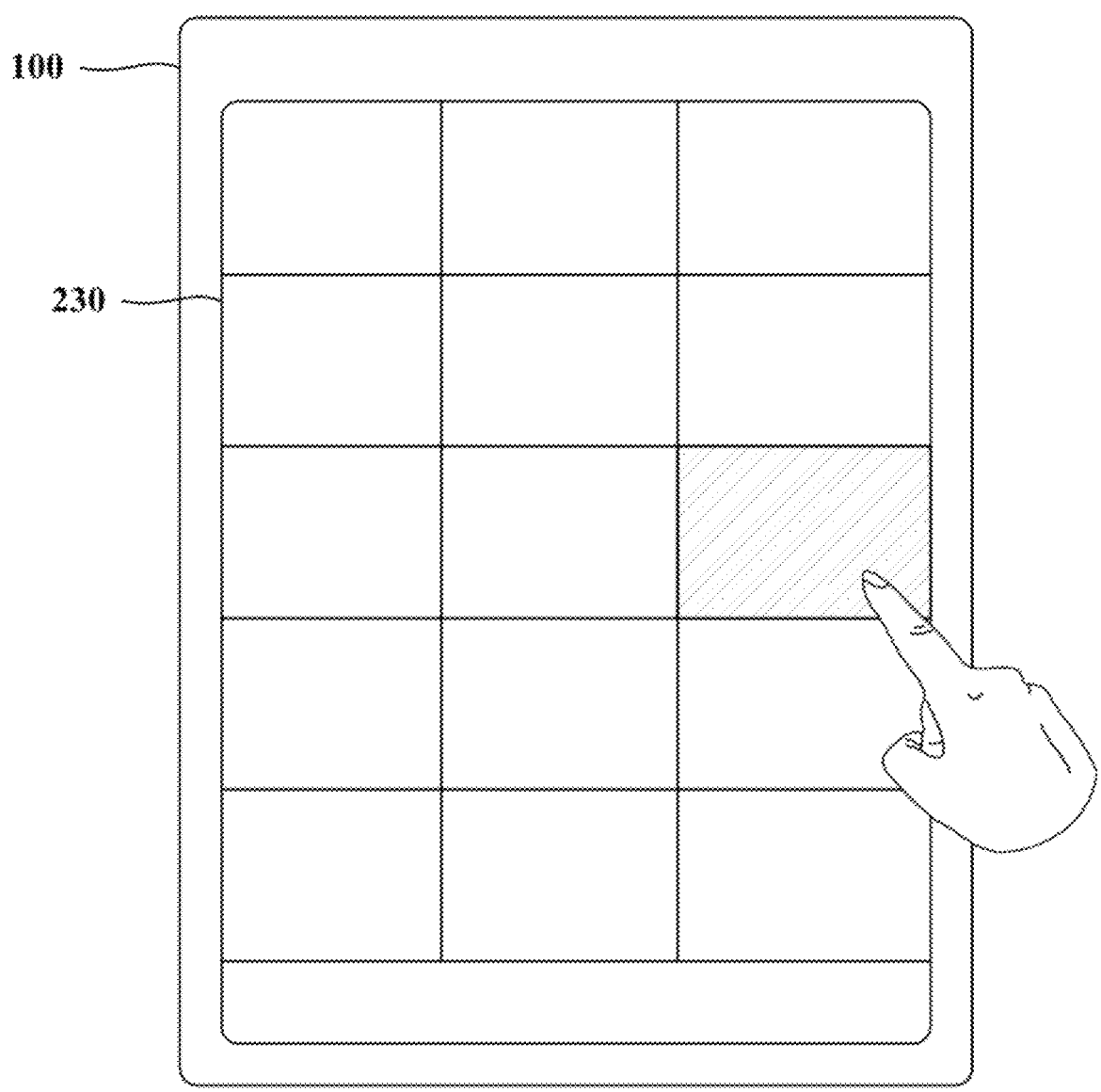

[FIG. 15]
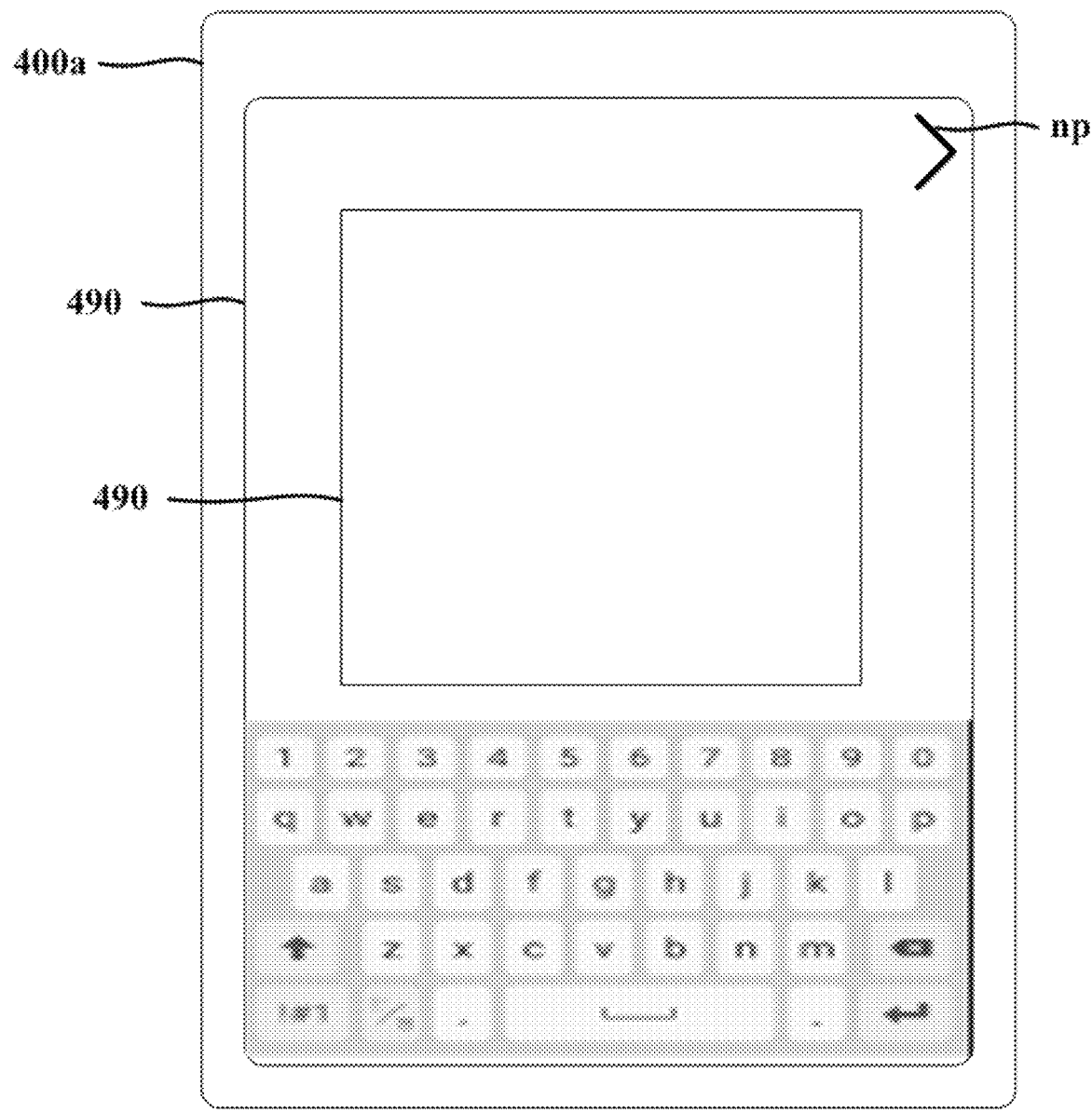

[FIG. 16]
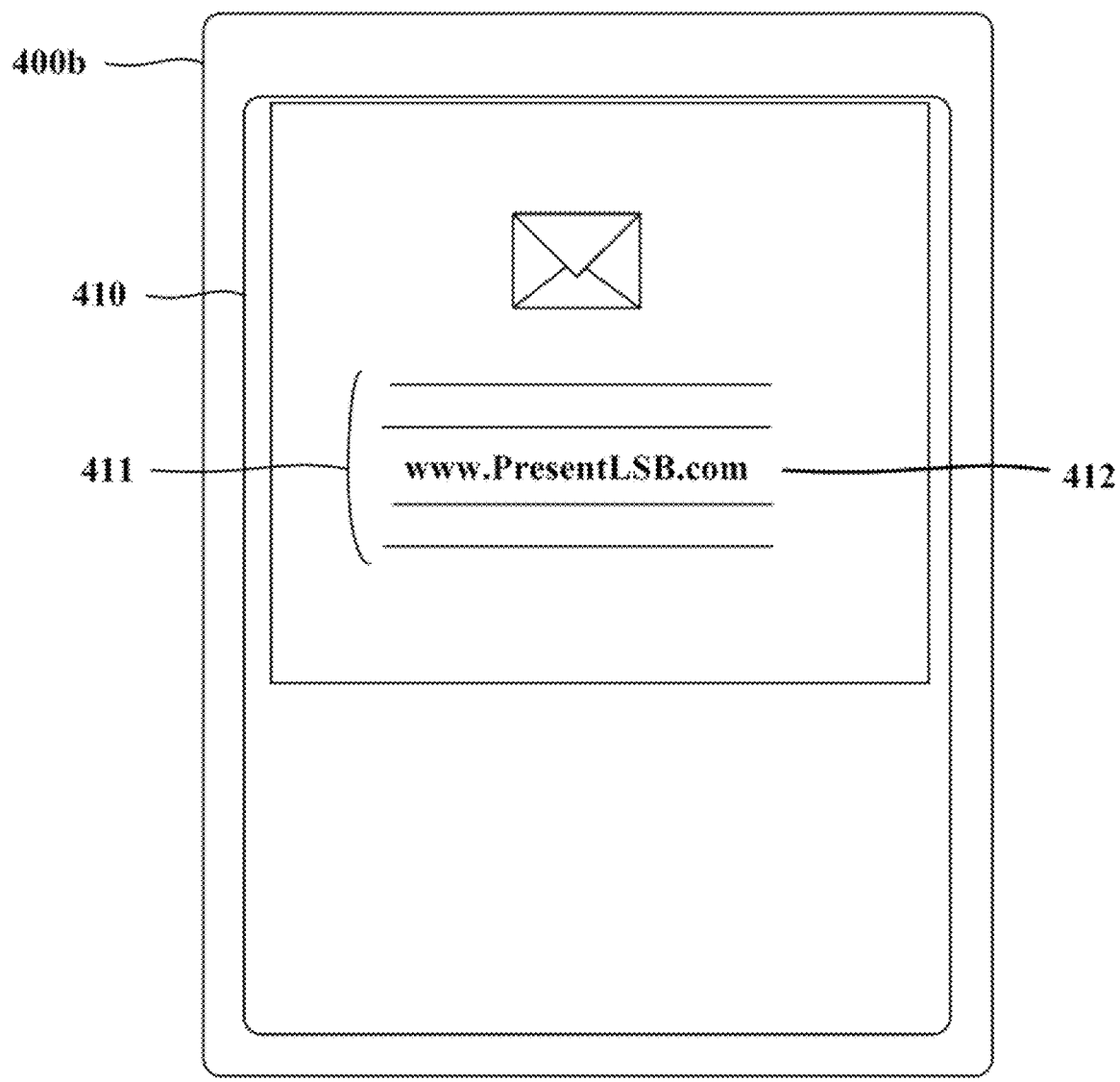

[FIG. 17]
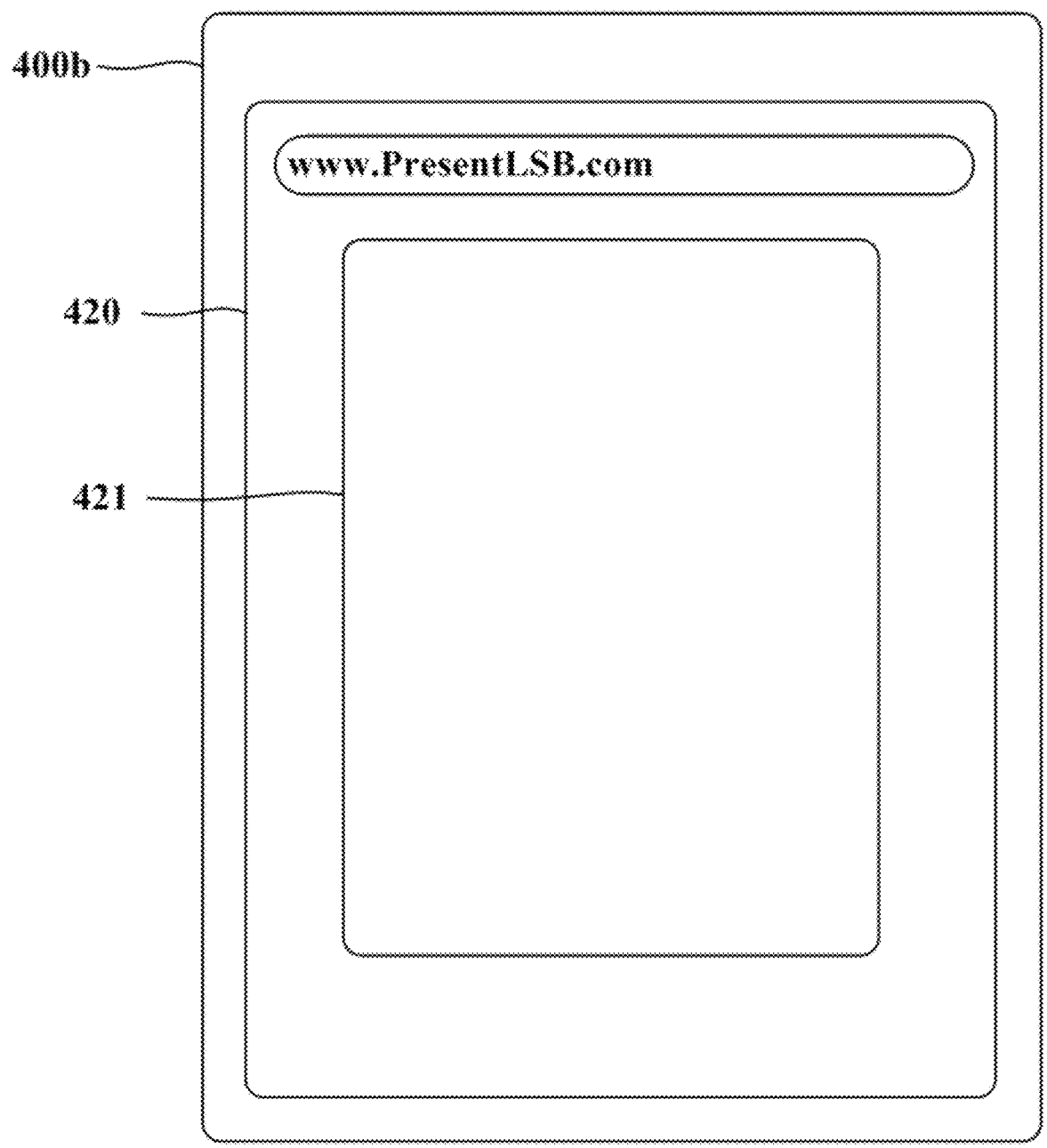

[FIG. 18]
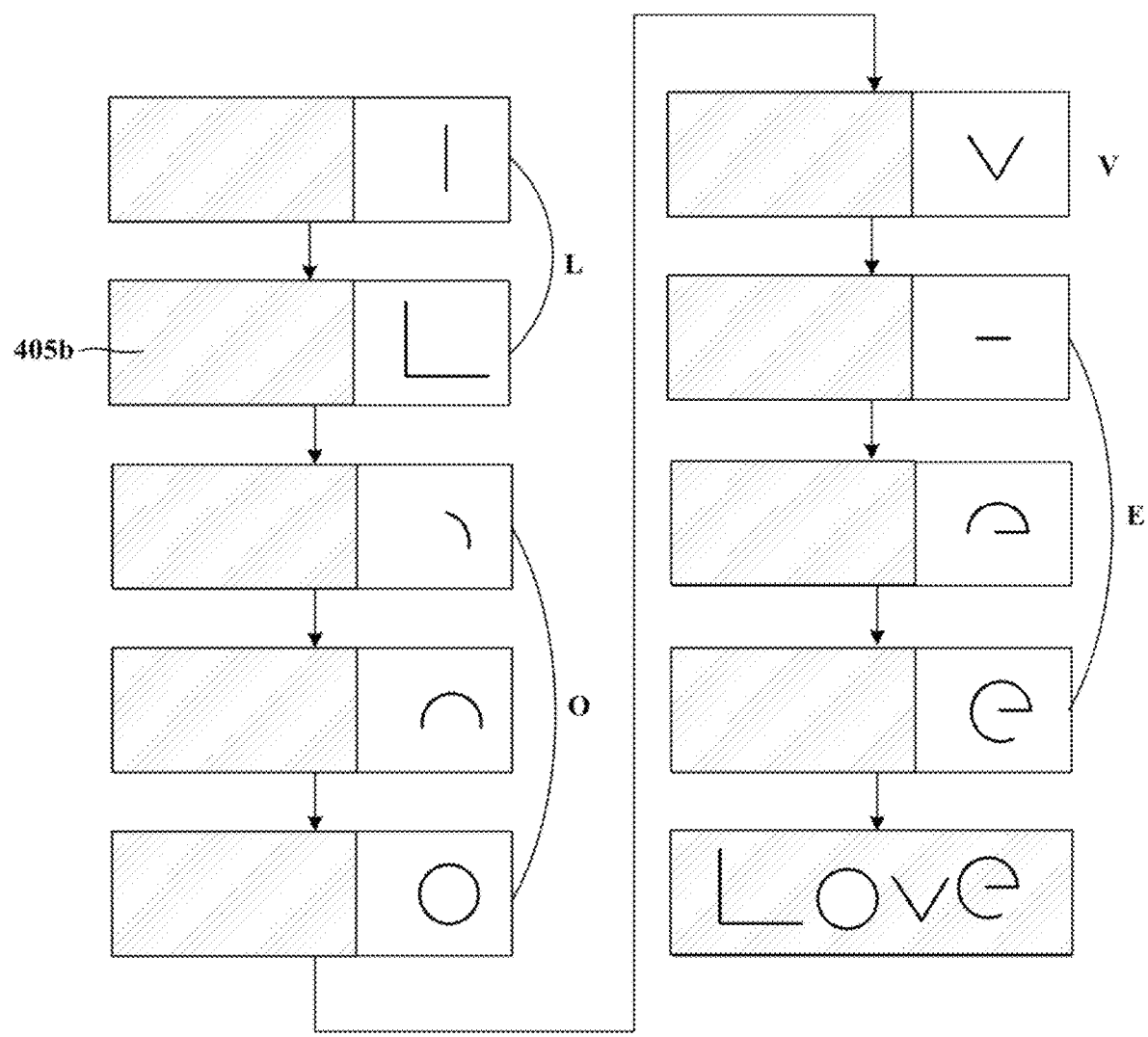

[FIG. 19]
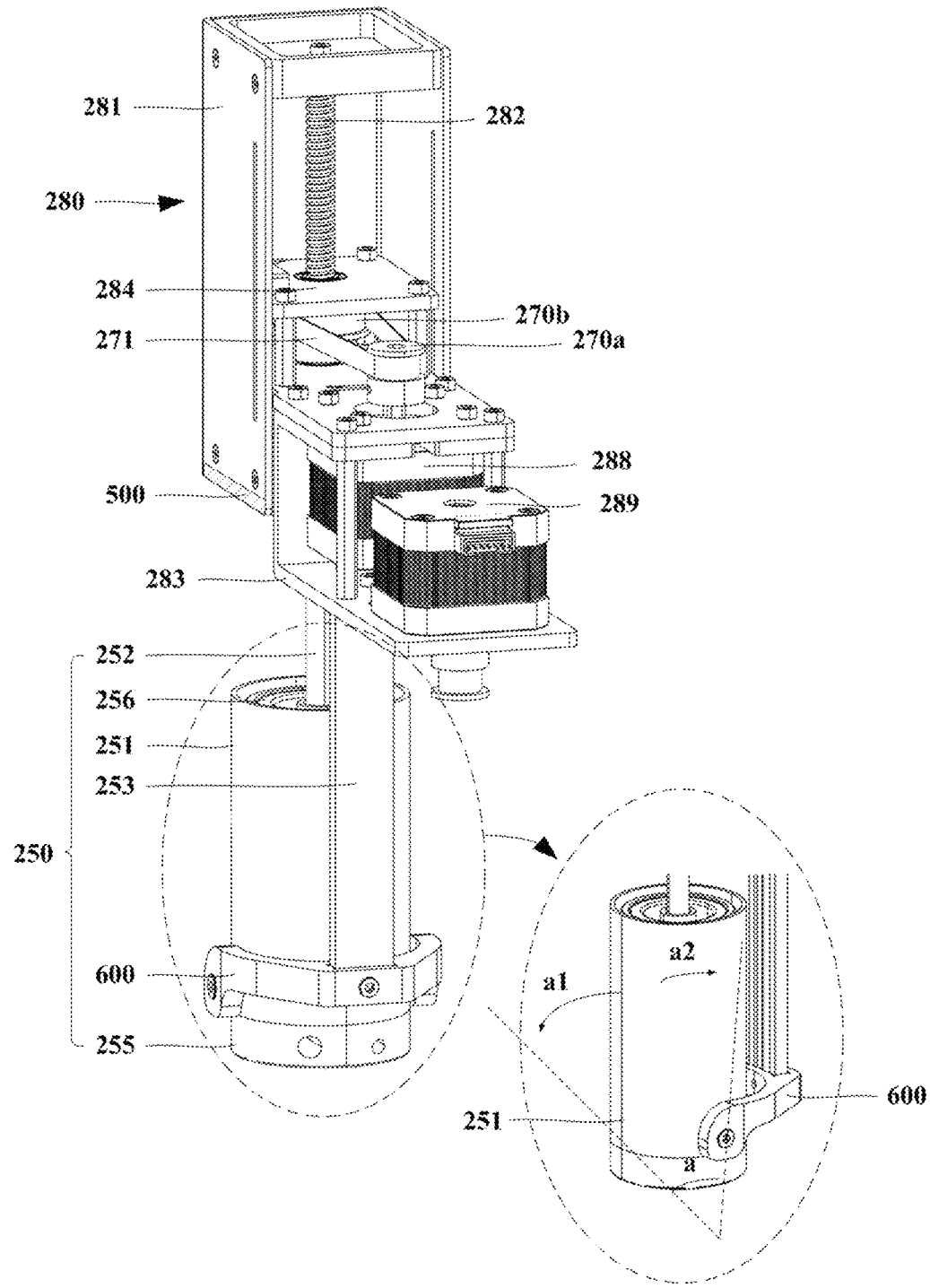

[FIG. 20]
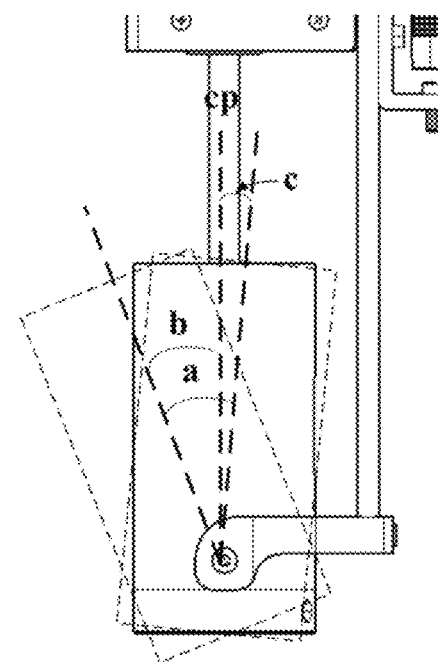
[FIG. 21]
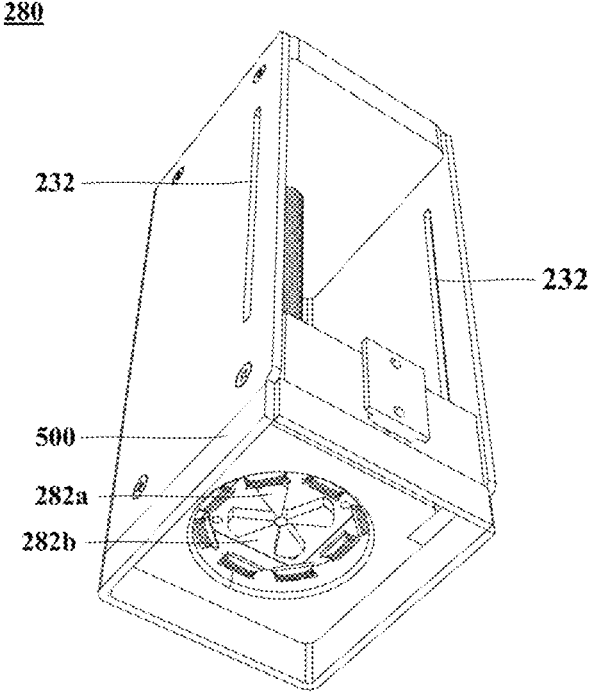

[FIG. 22]
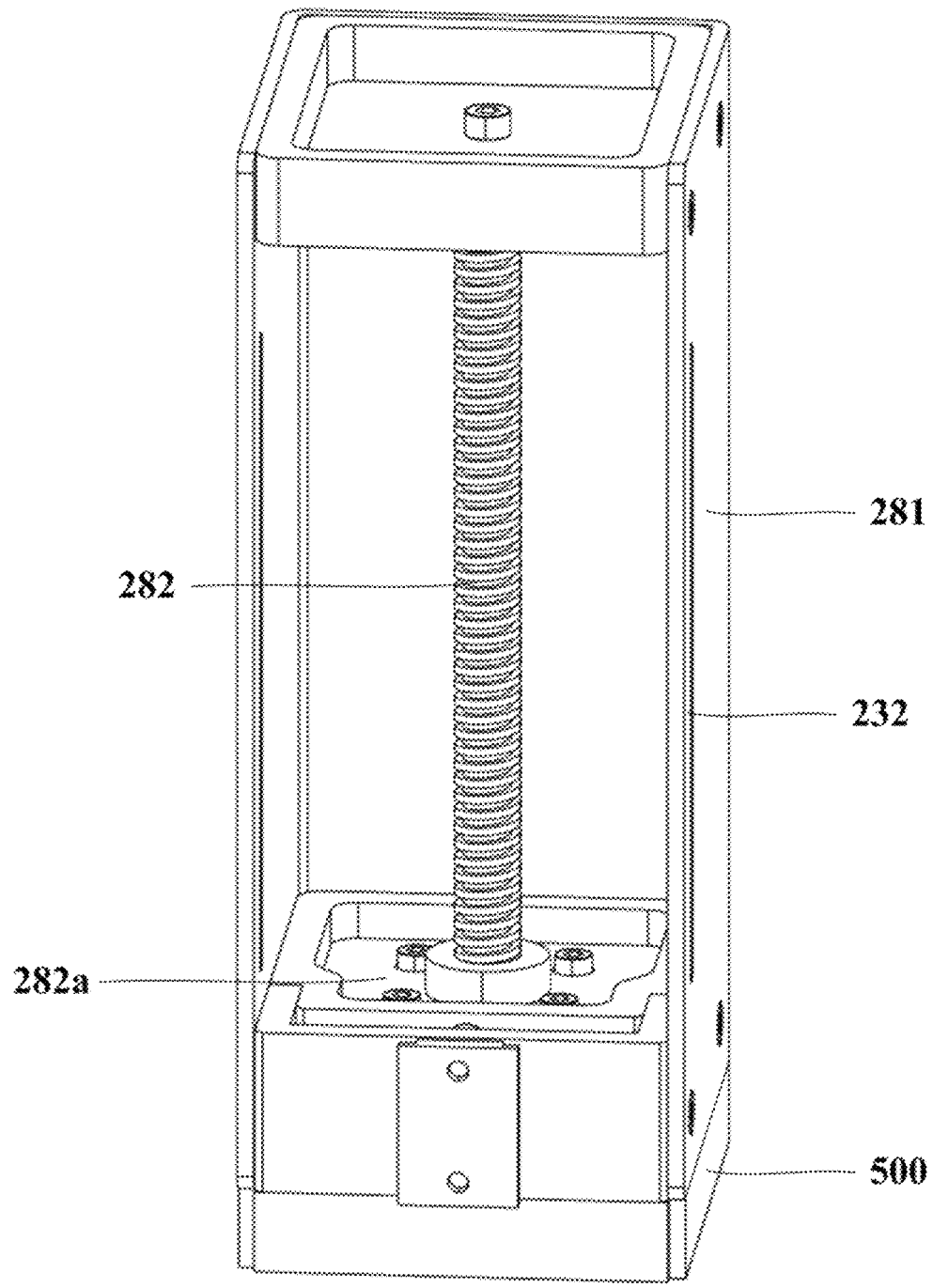

[FIG. 23]
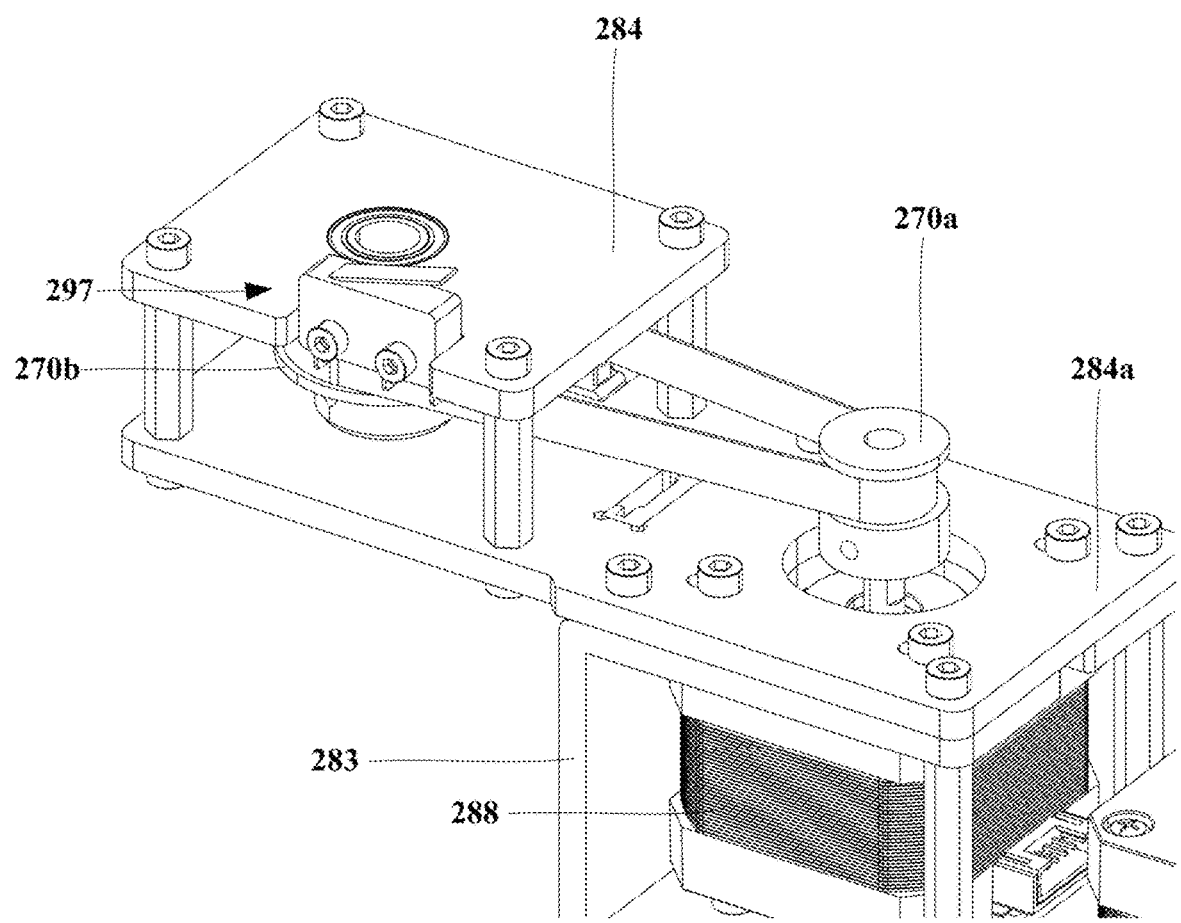

[FIG. 24]
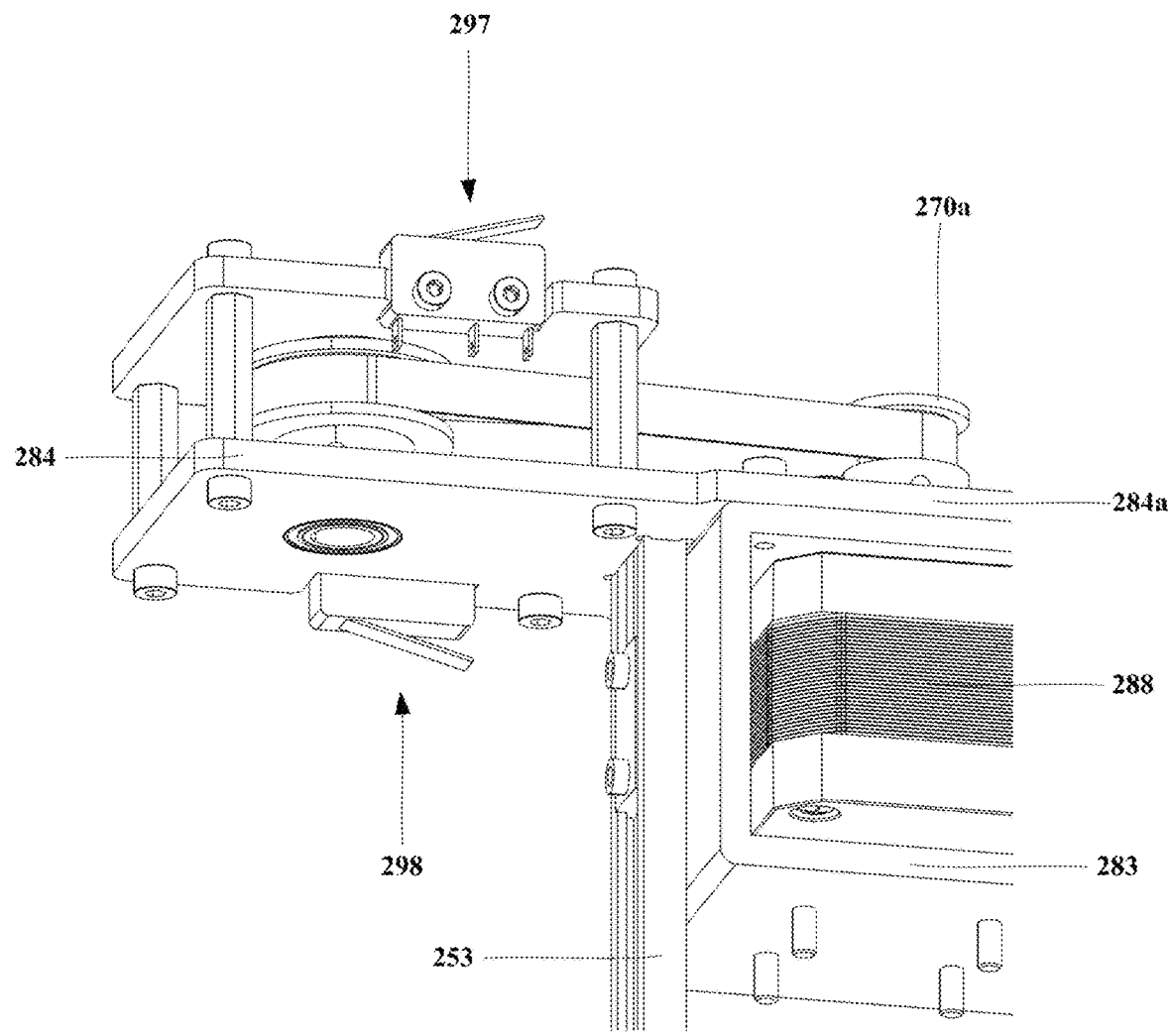

[FIG. 25]
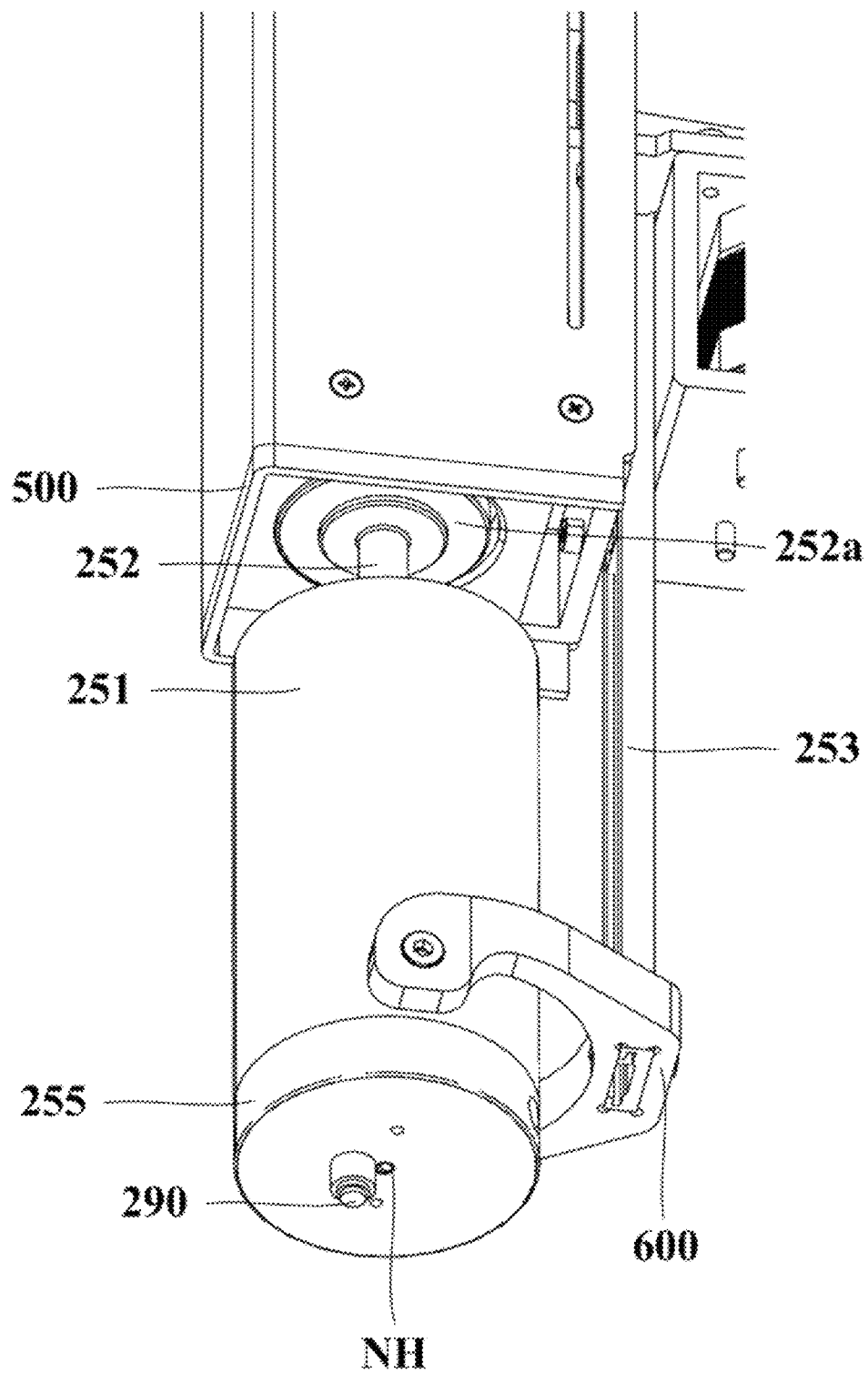

[FIG. 26]
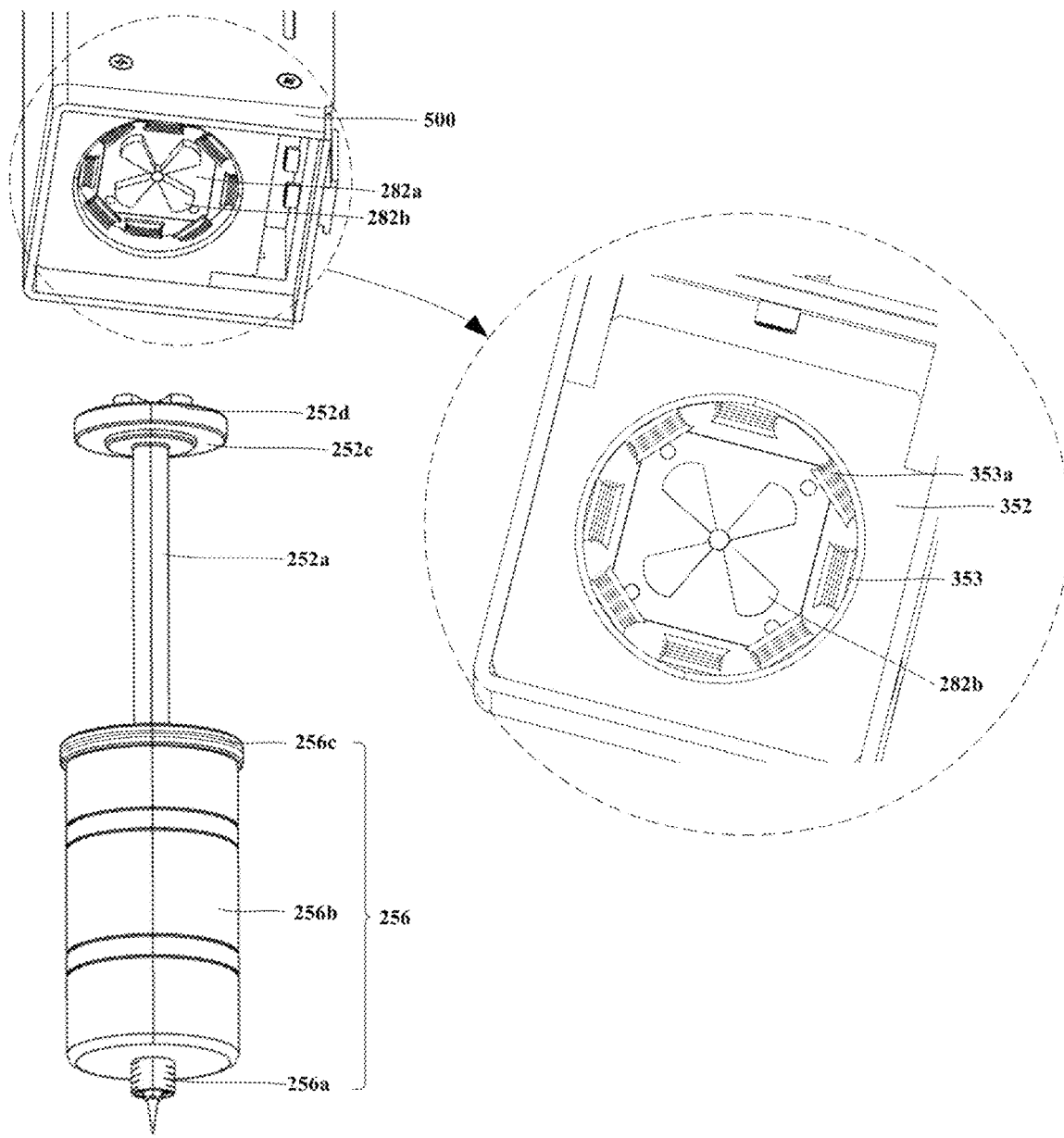

[FIG. 27A]
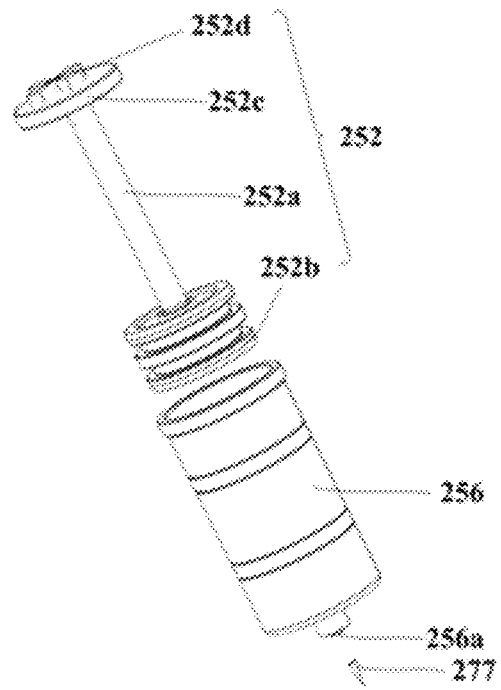
<A>
[FIG. 27B]
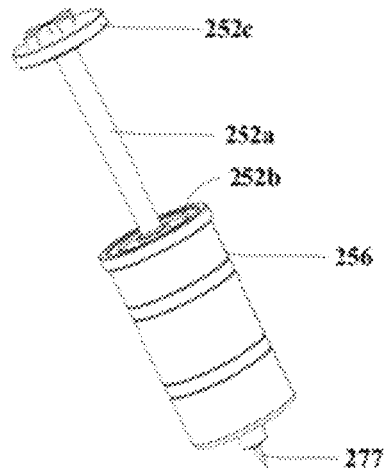
<B>

[FIG. 28A]
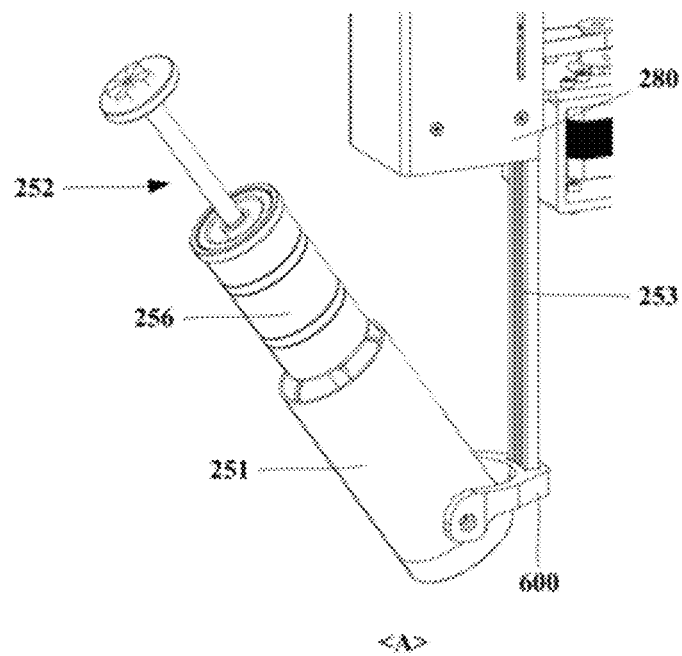
<A>
[FIG. 28B]
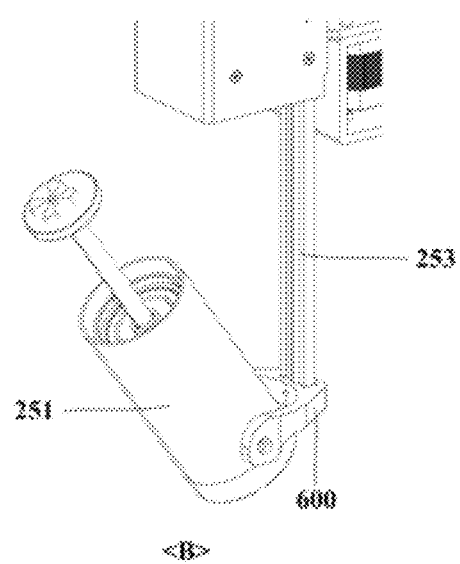
<B>

[FIG. 28C]
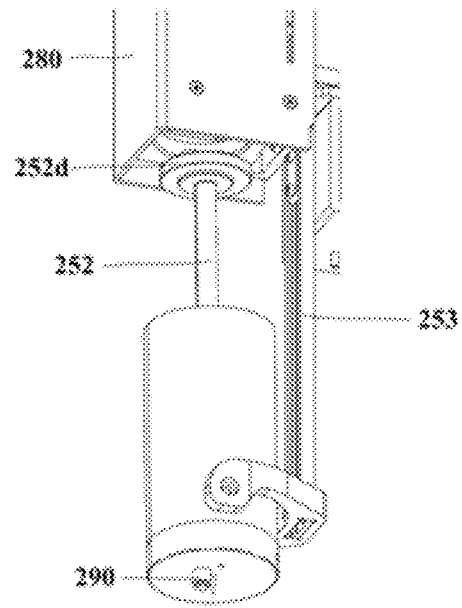
<C>
[FIG. 28D]
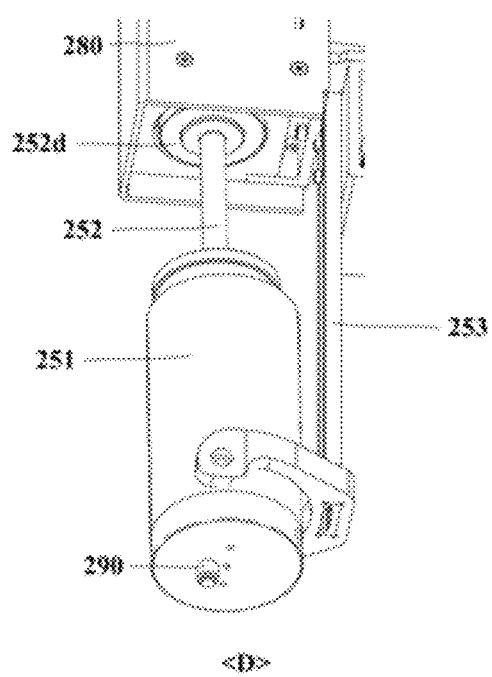
<D>

METHOD AND SYSTEM FOR PRODUCING, ORDERING, AND DELIVERING CONSUMER-CUSTOMIZED CAKES USING FOOD PRINTER CAPABLE OF PHOTOGRAPHING PRINTOUT

CROSS-REFERENCE TO RELATED APPLICATIONS

This application claims the priority of the Korean Patent Applications No. 10-2020-0156436 filed on Nov. 20, 2020 in the Korean Intellectual Property Office, the disclosure of which is incorporated herein by reference.

BACKGROUND OF THE DISCLOSURE

Field of the Disclosure

The present disclosure relates to a method and system for producing, ordering, and delivering consumer-customized cakes using a food printer capable of photographing a printout.

Related Art 3D food printing technology is food fabrication technology for incorporating a food composition ratio, nutritional data, etc. based on a 3D digital design produced through a CAD or a three-dimensional (3D) scanner and then reconfiguring food ingredients in a 3D manner by stacking the food ingredients step by step. The principle of the 3D printer is similar to the principle of an inkjet printer. The inkjet printer which may be called a two-dimensional (2D) printer receives a digitalized file and prints a 2D image, such as a print (or type) or a figure by spraying ink onto paper while moving an ink spray nozzle in a X-axis and Y-axis direction. The 3D printer implements a 3D stereoscopic shape by adding a movement in a Z-axis direction to the principle of the 2D printer.

The 3D food printing technology is not simply concentrated on a process of fabricating food, but is related to the design of a new form and texture and food which is fully customized for a person.

In 2006, a Hod Lipson professor laboratory in Cornell University in the U.S. showed the first 3D food printing using chocolate, cookies, and cheese as raw materials. A 3D food printer Fab@Home model used for the printing is an extrusion-based 3D printer for inputting food into a syringe and outputting the food, and may be said to be the matrix of products released so far. 3D printer leading companies and research groups in each country that drawn inspiration in the possibility of 3D printing using food make various attempts in order to secure original technology and improve technology, and actively develop materials specialized for development technology.

The 3D food printing technology so far has a form in which food is shaped on a base substrate based on predetermined 3D model data. However, recently, technology for re-forming food on the existing food in a location or form requested by a person is also actively discussed. Furthermore, 3D printer leading companies have growing interests in an overall system for producing, ordering and delivering consumer-customized food by grafting the 3D food printing technology onto a service model. It is expected that a new market can be created through such a system.

PRIOR ART DOCUMENT

Patent Document (Patent Document 001) Korean Patent No. 10-1620963

SUMMARY OF THE DISCLOSURE

An embodiment provides a method and system capable of additionally applying a personalized design on a cake having a ready-made form.

An embodiment provides a method and system for producing, ordering, and delivering a consumer-customized cake using a food printer.

An embodiment provides a method and system for producing, ordering and delivering a cake using a food printer capable of photographing a shaping process.

An embodiment provides a system capable of using a photographed image of a shaping process as a piece of content for a gift.

An embodiment provides a method and system for producing, ordering and delivering a cake using a food printer in which rotation means is positioned between a piston unit that fixes a capsule and a transfer unit and an extrusion cover and the capsule can be automatically separated and coupled easily.

In an aspect, an embodiment may provide a method of producing, ordering, and delivering a consumer-customized cake using a food printer capable of photographing a printout, including transmitting, by a terminal, a cake image selected among a plurality of displayed cake images to a management server; transmitting, to the management server, a decorated cake image selected among a plurality of displayed decorated cake images; receiving, from the management server, a plain cake model matched with the selected cake image and a main decoration model matched with the selected decorated cake image and displaying the plain cake model and the main decoration model; placing the main decoration model on the plain cake model in response to selection for a movement of the main decoration model and transmitting, to the management server, location information of the main decoration model on the plain cake model; receiving, from the management server, a primary decoration cake model which is a composite model of the plain cake model and the main decoration model based on the location information of the main decoration model on the plain cake model; placing an additional decoration model on the displayed primary decoration cake model in response to selection for a movement of the displayed additional decoration model and transmitting, to the management server, location information of the additional decoration model on the primary decoration cake model; receiving, from the management server, a secondary decoration cake model which is a composite model of the primary decoration cake model and the additional decoration model based on the location information of the additional decoration model on the primary decoration cake model; and receiving delivery information to which a cake on which additional decorations have been shaped by the food printer that receives food printer model data for the additional decoration model is to be reached, and transmitting the delivery information to the management server.

In another aspect, an embodiment may provide a method of producing, ordering, and delivering a consumer-customized cake using a food printer capable of photographing a printout, further including receiving, from the management server, a shaping process image of the additional decoration model and displaying the shaping process image; and transmitting, to the management server, information on a start point and end point of the shaping process image so that a camera device of the food printer photographs a shaping process when the food printer shapes the additional decorations on the cake based on the start point and the end point.

In another aspect, an embodiment may provide a method of producing, ordering, and delivering a consumer-customized cake using a food printer capable of photographing a printout, further including receiving, from the management server, a shaping process image of the additional decoration model and displaying the shaping process image; and transmitting, to the management server, information on a start point and end point of the shaping process image so that a camera device of the food printer photographs a shaping process when the food printer shapes the additional decorations on the cake based on the start point and the end point and a photographed image is transmitted to a cake recipient on the delivery information.

In another aspect, an embodiment may provide a method of producing, ordering, and delivering a consumer-customized cake using a food printer capable of photographing a printout, further including providing a tool for input of an additional decoration image; transmitting, to the management server, an additional decoration image input through the tool; and displaying the additional decoration model generated by the management server based on the additional decoration image.

In another aspect, an embodiment may provide a method of producing, ordering, and delivering a consumer-customized cake using a food printer capable of photographing a printout, further including providing a tool for input of content, wherein content input through the tool is transmitted to the management server so that composed content of the content and a photographed image of the food printer, composed by the management server, is transmitted to the cake recipient.

In another aspect, an embodiment may provide a method of producing, ordering, and delivering a consumer-customized cake using a food printer capable of photographing a printout, wherein the shaping process image of the additional decoration model is a virtual shaping process image of the additional decoration model generated based on the food printer model data.

In another aspect, an embodiment may provide a method of producing, ordering, and delivering a consumer-customized cake using a food printer capable of photographing a printout, wherein the tool for the input of the additional decoration image is a tool for text input and/or drawing input.

BRIEF DESCRIPTION OF THE DRAWINGS

FIG. 1A is an exemplary block diagram of a cake order system using a food printer according to an embodiment of the present disclosure.

FIG. 1B is a schematic diagram of the food printer that receives food printer model data from a seller server and shapes additional decorations on a cake.

FIG. 2 is a flowchart illustrating a method of ordering a user-customized cake using the cake order system according to an embodiment of the present disclosure.

FIG. 3, FIG. 4, FIG. 5, FIG. 6, FIG. 7, FIG. 8, FIG. 9, FIG. 10, FIG. 11, FIG. 12, FIG. 14, and FIG. 15 are exemplary diagrams of various user interfaces on a consumer terminal.

FIG. 13 is a diagram for describing an image of a virtual shaping process.

FIG. 16 and FIG. 17 are schematic diagrams of display screens of a recipient terminal.

FIG. 18 is a schematic diagram for describing an image note displayed in the recipient terminal.

FIG. 19 is a perspective view illustrating the structure of an extrusion unit positioned in the food printer.

FIG. 20 illustrates part of the extrusion unit for describing the rotation of an extrusion cover.

FIG. 21 and FIG. 22 are perspective views illustrating an extrusion driving unit positioned in the extrusion unit of the food printer.

FIG. 23 and FIG. 24 are perspective views illustrating a connection structure for the extrusion driving unit and motor of the food printer.

FIG. 25 is a perspective view illustrating a coupling structure for the extrusion driving unit and extruder of the food printer.

FIG. 26 is a view for explaining the magnetic coupling between a piston unit on a capsule and a magnetic force provision means in order to separate the capsule on a extrusion cover.

FIG. 27A and FIG. 27B are a diagram for explaining a fastening relationship between a piston unit, a capsule, and a nozzle unit in extruder of the food printer.

FIG. 28A, FIG. 28B, FIG. 28C and FIG. 28D are a diagram for describing the coupling of the extruder and the extrusion cover and a coupling relation between the extruder and the transfer unit.

DESCRIPTION OF EXEMPLARY EMBODIMENTS

The present disclosure may be modified in various ways and may have various embodiments. Specific embodiments are to be illustrated in the drawings and are to be described the detailed description. The effects and characteristics of the present disclosure and a method for achieving them will become evident with reference to the embodiments described in detail along with the drawings. However, the present disclosure is not limited to the following embodiments, but may be implemented in various forms. In the following embodiments, terms, such as the first and the second, are not used as limiting meanings, but are used to distinguish one component from the other component. Furthermore, an expression of the singular number includes an expression of the plural number unless clearly defined otherwise in the context. Furthermore, a term, such as "include" or "have", is intended to designate that a characteristic or component described in the specification is present, and do not exclude the possible addition of one or more other characteristics or components in advance. Furthermore, in the drawings, the size of each of components may be enlarged or reduced for convenience of description. For example, the size and thickness of each of components shown in the drawings is arbitrarily illustrated for convenience of description, and thus the present disclosure is not essentially limited thereto.

Hereinafter, embodiments of the present disclosure are described in detail with reference to the accompanying drawings. In describing the embodiments with reference to the accompanying drawings, the same component is assigned the same reference numeral, and a redundant description of the same component is omitted.

FIG. 1A is an exemplary block diagram of a cake order system 10 using a food printer according to an embodiment of the present disclosure. Furthermore, FIG. 1B is a schematic diagram of the food printer that receives food printer model data from a seller server and shapes additional decorations on a cake.

Referring to FIGS. 1A and 1B, the cake order system 10 using a food printer according to an embodiment of the present disclosure may include a food printer 100, a management server 200, a seller server 300, a user terminal 400, and a network 500a.

The user terminal 400 may include a consumer terminal 400a and an article recipient terminal 400b.

The user terminal 400 is equipped with a radio frequency (RF) circuit. The RF circuit communicates with other device devices selectively over the networks 500a, for example, the Internet referred to as a world wide web (WWW), the intranet and/or a wireless network, for example, a cellular telephone network, a wireless local area network (LAN) and/or a metropolitan area network (MAN) through wireless communication. The wireless communication selectively includes global system for mobile communications (GSM), enhanced data GSM environment (EDGE), high-speed downlink packet access (HSDPA), high-speed uplink packet access (HSDPA), evolution, data-only (EV-DO), HSPA, HSPA+, dual-cell HSPA (DC-HSPDA), long term evolution (LTE), near field communication (NFC), wideband code division multiple access (W-CDMA), code division multiple access (CDMA), time division multiple access (TDMA), Bluetooth, wireless fidelity (Wi-Fi) (e.g., IEEE 802.11a, IEEE 802.11b, IEEE 802.11g and/or IEEE 802.11n), a voice over Internet protocol (VoiP), Wi-MAX, protocols for e-mail (e.g., Internet message access protocol (IMAP) and/or post office protocol (POP)), instant messaging (e.g., an extensible messaging and presence protocol (XMPP), a session initiation protocol for instant messaging and presence leveraging extensions (SIMPLE), instant messaging and presence service (IMPS)) and/or short message service (SMS), or given other suitable communication protocols including communication protocols that have not yet been developed so far before a filing data of this document, but may include a given one among a plurality of communication standards, protocols and techniques, but is not limited thereto.

Embodiments of the terminals 400a and 400b, user interfaces for such terminals, and associated processes for using such terminals are described.

In the following discussion, a terminal including a display and a touch sensitive surface is described. However, it is to be understood that the terminal selectively includes one or more other physical user interface devices, such as a physical keyboard, mouse and/or joystick.

The terminal 400a, 400b typically supports the following one or more various applications: a drawing application, a presentation application, a word processing application, a website fabrication application, a disk fabrication application, a spreadsheet application, a game application, a telephone application, a video conference application, an e-mail application, an instant messaging application, a payment support application, a photo management application, a digital camera application, a digital video camera application, a web browsing application, a digital music player application and/or a digital video player application.

Various applications executed on the terminal 400a, 400b selectively use at least one universal physical user interface device, such as a touch sensitive surface. Correspondence information displayed on a device in addition to one or more functions of the touch sensitive surface is selectively adjusted and/or is changed from one application to a next application and/or within each application. In such a manner, universal physical architecture (such as the touch sensitive surface) of a device selectively supports various applications using user interfaces that are intuitive and clear to a user.

A touch screen in the terminal 400a, 400b is selectively touched using a given suitable object or belongings, such as a stylus or a finger. In some embodiments, a user interface is designed to operate chiefly using a finger-based touch and gesture. This may be more precise than a stylus-based input due to a wider touch area of a finger on the touch screen. In some embodiments, the terminal 400a, 400b converts an approximate finger-based input into a precise pointer/cursor location or a command for enabling a user to perform desired operations.

Furthermore, the terminal 400a, 400b may use a GPS receiver in order to detect location information of the terminal 400a, 400b.

In some embodiments, software components stored in the memory of the terminal 400a, 400b includes an operating system, a communication module (or a set of instructions), a content/motion module (or a set of instructions), a graphic module (or a set of instructions), a text input module (or a set of instructions), a global positioning system (GPS) module (or a set of instructions), a payment processing module (or a set of instructions) and applications (or a set of instructions).

FIG. 2 is a flowchart illustrating a method of ordering a user-customized cake using the cake order system according to an embodiment of the present disclosure.

Referring to FIG. 2, the method of ordering a user-customized cake using the cake order system according to an embodiment of the present disclosure may include the step S101 of transmitting, to the management server, a cake image selected among a plurality of displayed cake images, the step S103 of transmitting, to the management server, a decorated cake image selected among a plurality of displayed decorated cake images, the step S105 of receiving, from the management server, a cake model matched with the selected cake image and a decoration model matched with the selected decorated cake image and displaying the cake model and the decoration model, the step S107 of placing the decoration model on the cake model in response to selection for a movement of the decoration model and transmitting, to the management server, location information of the decoration model on the cake model, the step S109 of receiving a decoration cake model, that is, a composite model of the cake model and decoration model, from the management server based on the location information of the decoration model on the cake model, and the step S111 of receiving delivery information to which a cake having decorations shaped thereon by the food printer that has received food printer model data of the decoration model will be delivered and transmitting the delivery information to the management server.

At step S105, the cake model may be a plain cake model or a primary decoration cake model. Furthermore, the decoration model may be a main decoration model or an additional decoration model. The additional decoration model may be data that the consumer terminal 400a has received from the management server 200 or may be model data converted from additional decoration image, input by a consumer through the consumer terminal 400a, by the management server 200. Furthermore, at step S109, the decoration cake model, that is, the composite model, may be a primary decoration cake model or a secondary decoration cake model, that is, a composite of the primary decoration cake model and the additional decoration model. Hereinafter, each of the steps is described in detail.

FIGS. 3 to 12, 14, and 15 are exemplary diagrams of various user interfaces on a consumer terminal.

As illustrated in FIGS. 3 to 14, it is to be noted that a user interface illustrated after a corresponding user interface after a given user interface is not essentially displayed on the consumer terminal, and another interface not illustrated in a drawing may be displayed.

Referring to FIGS. 3 to 14, a method of accessing, by a consumer, the management server 200 through the consumer terminal 400a and ordering a cake is described.

The consumer may access a cake order webpage, provided by the management server 200, through the consumer terminal 400a.

In some embodiments, an application for cake order provided by the management server 200 may be installed in the consumer terminal 400a. The application for cake order may be executed in the consumer terminal 400a.

Referring to FIG. 3, a first user interface 410 may be displayed on the consumer terminal 400a when the application for cake order is executed. Map information 411 may be displayed in the first user interface 410.

The consumer terminal 400a may display the map information 411 within a given radius range of a current location based on current location information of the consumer terminal 400a.

Area information 412 matched with the map information 411 displayed in the first user interface 410 may be displayed.

The first user interface 410 may include area information selection affordance 413.

The consumer terminal 400a may display area information category in response to the selection of the area information selection affordance 413. Furthermore, the consumer terminal 400a may update the map information 411 so that a map within a given radius range of selected area information is displayed in response to the selection of any one piece of area information within the displayed area information category.

Illustratively, a user may select area information corresponding to the destination of a cake within an area information category in the consumer terminal 400a. The consumer terminal 400a may transmit the selected area information to the management server 200.

When receiving the area information, the management server 200 may transmit, to the consumer terminal 400a, map information in which at least one seller shop 411a capable of delivery to received area information is displayed. Furthermore, the consumer terminal 400a may receive the map information from the management server 200 and display the map information.

Referring to FIG. 4, when the selection of the delivery area of the cake is completed, a second user interface 420 may be displayed on the consumer terminal 400a.

A plurality of cake images 421 may be displayed in the second user interface 420.

The plurality of cake images 421 may be image information of cakes handled by the plurality of seller shops 411a on the map information 411 of FIG. 3.

The consumer terminal 400a may receive, from the management server 200, image information of cakes which may be produced and sold in the plurality of seller shops 411a on the map information 411 of FIG. 3, and may display the image information.

The consumer terminal 400a may update the cake image 421 displayed in response to the input of a sliding touch in the second user interface 420. Illustratively, when the consumer inputs a sliding touch that moves from the bottom of the display of the consumer terminal 400a to the top thereof, a cake image in a next page may be displayed on the display. In some embodiments, a page including a cake image displayed in the second user interface 420 may be changed by touching a sliding bar "sb" displayed in the second user interface 420.

The consumer terminal 400a may transmit, to the management server 200, any one selected cake image of the plurality of cake images 421.

Referring to FIG. 5, the consumer terminal 400a may display a third user interface 430 in response to the completion of the selection of the cake image. In some embodiments, a cake image selected in response to the selection of next page affordance "np" in the second user interface 420 of FIG. 4 may be transmitted to the management server 200, and the third user interface 430 of FIG. 5 may be displayed.

A plurality of decorated cake images 431 may be displayed in the third user interface 430.

The plurality of decorated cake images 431 may be image information on decorated cakes which may be handled in the plurality of seller shops 411a on the map information 411 of FIG. 3.

The consumer terminal 400a may receive, from the management server 200, image information on decorated cakes which may be handled in the plurality of seller shops 411a on the map information 411 of FIG. 3, and may display the image information.

The consumer terminal 400a may update the plurality of decorated cake images 431 displayed in response to the input of a sliding touch in the third user interface 430. Illustratively, when the consumer inputs a sliding touch that moves from the bottom of the display of the consumer terminal 400a to the top thereof, a decorated cake image in a next page may be displayed on the display. In some embodiments, a page including the plurality of decorated cake images 431 displayed in the third user interface 430 may be changed by touching the sliding bar "sb" displayed in the third user interface 430.

The consumer terminal 400a may transmit, to the management server 200, any one selected decorated cake image among the plurality of decorated cake images 431.

Referring to FIG. 6, the consumer terminal 400a may display a fourth user interface 440 in response to the completion of the selection of the decorated cake image. In some embodiments, a decorated cake image selected in response to the selection of the next page affordance "np" in the third user interface 430 of FIG. 5 may be transmitted to the management server 200, and the fourth user interface 440 of FIG. 6 may be displayed.

The fourth user interface 440 may display a main decoration model 441.

The main decoration model 441 corresponds to a decoration portion in the selected decorated cake image described with reference to FIG. 5.

In some embodiments, the consumer terminal 400a may receive the main decoration model 441, that is, 3D model data, from the management server 200.

In some embodiments, the consumer terminal 400a may receive the main decoration model 441, that is, 3D model data, from the management server 200, and may display the main decoration model 441 in the form of an image having a 2D form.

The fourth user interface 440 may display a plain cake model 443.

The plain cake model 443 has the same form as the cake displayed in the selected cake image of FIG. 4, but is a cake model not including a decoration design, that is, decorations.

In some embodiments, the consumer terminal 400a may receive, from the management server 200, the plain cake model 443 that is 3D model data and matched with a decorated cake image selected by the consumer.

In some embodiments, the consumer terminal 400a may receive the plain cake model 443, that is, 3D model data, from the management server 200, and may display the plain cake model 443 in the form of an image having a 2D form.

A consumer may move the main decoration model 441, displayed in the fourth user interface 440, into the plain cake model 443 by dragging the main decoration model 441. That is, the consumer terminal 400a may detect a touch on the main decoration model 441 displayed in the fourth user interface 440 and then a continuous movement of a touch, and may detect the termination of the touch.

In some embodiments, the consumer terminal 400a may determine whether the main decoration model 441 is located within the region of the plain cake model 443 in response to the selection of the next page affordance "np" in the fourth user interface 440.

When the main decoration model 441 is not located within the region of the plain cake model 443, the consumer terminal 400a may display a notification message "Please designate a main decoration location on the cake."

When the main decoration model 441 is located within the region of the plain cake model 443, the consumer terminal 400a may generate location information of the main decoration model 441 within the region of the plain cake model 443, and may transmit the location information to the management server 200. Furthermore, the management server 200 may generate a primary decoration cake model by composing the main decoration model and the plain cake model based on the location information of the main decoration model 441 received from the consumer terminal 400a. In this case, the primary decoration cake model may be 3D model data.

In some embodiments, the fourth user interface 440 may include 3D conversion affordance "3da."

The consumer terminal 400a may determine whether the main decoration model 441 is located within the region of the plain cake model 443 in response to the selection of the 3D conversion affordance "3da."

When the main decoration model 441 is not located within the region of the plain cake model 443, the consumer terminal 400a may display a notification message "Please designate a main decoration location on the cake."

When the main decoration model 441 is located within the region of the plain cake model 443, the consumer terminal 400a may generate location information of the main decoration model 441 within the region of the plain cake model 443 and a 3D conversion request signal, and may transmit the location information and the 3D conversion request signal to the management server 200.

The management server 200 may generate a primary decoration cake model based on the location information of the main decoration model 441 in response to the 3D conversion request signal, and may transmit the primary decoration cake model to the consumer terminal 400a.

The consumer terminal 400a may receive the primary decoration cake model from the management server 200, and may display the primary decoration cake model in a 3D model form. Furthermore, the consumer terminal 400a may detect a movement direction of an input sliding touch, and may rotate the primary decoration cake model displayed in accordance with the movement direction. Accordingly, the consumer may monitor the primary decoration cake model at various angles.

The main decoration model 441 has been illustrated being located above the plain cake model 443, but the present disclosure is not limited thereto. The main decoration model 441 may be located at the side of the plain cake model 443.

In some embodiments, a (5-1)-th user interface 450a FIG. 7 may be displayed in response to the selection of the next page affordance "np" in the fourth user interface 440 of FIG. 6.

The consumer terminal 400a may receive, from the management server 200, a plurality of additional decoration images previously registered with the management server 200.

The (5-1)-th user interface 450a may display a received additional decoration image 45.

The additional decoration image 45 may include a first additional decoration image 451 and a second additional decoration image 452.

A first additional decoration in the first additional decoration image 451 may be a letter decoration. Furthermore, a second additional decoration in the second additional decoration image 452 may be a drawing decoration.

A consumer may select any one of a plurality of additional decoration images 45 displayed in the (5-1)-th user interface 450a.

The consumer terminal 400a may detect any one selection (e.g., a touch input) for the plurality of displayed additional decoration images 45, and may transmit information of the selected additional decoration image 45 to the management server 200. Furthermore, when receiving the information of the selected additional decoration image 45, the management server 200 may generate additional decoration model data matched with the information. In another aspect, additional decoration model data that belongs to a plurality of additional decoration model data previously stored in the management server 200 and that is matched with the additional decoration image 45 selected by the consumer may be read.

When the consumer completes the selection of any one of the plurality of displayed additional decoration images 45, the consumer terminal 400a may display a (6-1)-th user interface 460a illustrated in FIG. 8.

In another aspect, the (6-1)-th user interface 460a of FIG. 8 may be displayed in response to the selection of the next page affordance "np" in the (5-1)-th user interface 450a of FIG. 7.

The consumer terminal 400a may receive additional decoration model data from the management server 200 and display the additional decoration model data in the (6-1)-th user interface 460a.

An additional decoration model 461 for the selected additional decoration image 45 described with reference to FIG. 7 is displayed in the (6-1)-th user interface 460a.

Furthermore, the consumer terminal 400a may receive primary-decorated cake model data from the management server 200 and display a decorated cake model 463.

The consumer may move the additional decoration model 461, displayed in the (6-1)-th user interface 460a, into the primary-decorated cake model 463 by dragging the additional decoration model 461. That is, the consumer terminal 400a may detect a touch on the additional decoration model 461 displayed in the (6-1)-th user interface 460a and then a continuous movement of a touch, and may detect the termination of the touch.

In some embodiments, the consumer terminal 400a may determine whether the additional decoration model 461 is located within the region of the primary-decorated cake model 463 in response to the selection of the next page affordance "np" displayed in the (6-1)-th user interface 460a.

When the additional decoration model 461 is not located within the region of the primary-decorated cake model 463, the consumer terminal 400a may display a notification message "Please designate a location of additional decorations on the cake."

Furthermore, when the location of the main decoration model 441 and the location of the additional decoration model 461 overlap within the region of the primary-decorated cake model 463, the consumer terminal 400a may display a notification message "Please move the location of additional decorations to a location where the main decoration is not present."

When the location of the main decoration model 441 and the location of the additional decoration model 461 do not overlap within the region of the primary-decorated cake model 463, the consumer terminal 400a may generate location information of the additional decoration model 461 on the primary-decorated cake model 463, and may transmit the location information to the management server 200. Furthermore, the management server 200 may generate secondary-decorated cake model data by composing the additional decoration model and the primary-decorated cake model based on the location information of the additional decoration model 461.

In some embodiments, the (6-1)-th user interface 460a may provide a tool function for adjusting the size or rotation angle of the additional decoration model 461. Accordingly, the consumer may place the additional decoration model 461 on the primary-decorated cake model 463 by adjusting the size or rotation angle of the additional decoration model 461.

In some embodiments, the (6-1)-th user interface 460a may include a 3D conversion affordance "3da."

The consumer terminal 400a may transmit a 3D conversion request signal to the management server 200 in response to the selection of the 3D conversion affordance "3da." Furthermore, the management server 200 may generate secondary-decorated cake model data in response to the reception of the 3D conversion request signal, and may transmit the secondary-decorated cake model data to the consumer terminal 400a.

The consumer terminal 400a may receive the secondary-decorated cake model data from the management server 200 and display a secondary-decorated cake model having a 3D form. Furthermore, the consumer terminal 400a may detect a movement direction of an input sliding touch, and may change an angle of the secondary-decorated cake model displayed in accordance with the movement direction. Accordingly, the consumer can view the secondary-decorated cake model at various angles.

The additional decoration model 461 has been illustrated as being located above the primary-decorated cake model 443, but the present disclosure is not limited thereto. The additional decoration model 461 may be located at the side of the primary-decorated cake model 443.

In another aspect, referring to FIG. 9, a (5-2)-th user interface 450b of FIG. 9 may be displayed in response to the selection of the next page affordance "np" in the fourth user interface 440 of FIG. 6.

The (5-2)-th user interface 450b provides a tool for enabling a consumer to directly input additional decorations. Accordingly, the consumer may directly input additional decorations in the (5-2)-th user interface 450b.

The consumer terminal 400a may display a predetermined color and a point having a predetermined thickness based on a touch input point within the drawing region "da" of the (5-2)-th user interface 450b. Furthermore, when an input including continuous touches is present, a line may be displayed along touch points. A consumer may freely input additional decorations in the drawing region "da."

In some embodiments, the (5-2)-th user interface 450b may provide a tool box for changing the thickness of a displayed point.

In some embodiments, the (5-2)-th user interface 450b may also provide a task a 3D model task tool box for enabling the consumer to draw a 3D model.

When the consumer completes an additional decoration drawing process, the consumer terminal 400a may display a (5-3)-th user interface 450c illustratively displayed in FIG. 10.

The (5-3)-th user interface 450c may display an additional decoration image 457 input by the consumer in the (5-2)-th user interface 450b. Furthermore, the (5-3)-th user interface 450c may provide a keyboard tool "kb" for inputting lettering information 454, such as text. The consumer may input the lettering information 454 through the keyboard tool "kb." The lettering information 454 input by the consumer may be converted into an image and displayed at a place adjacent to the additional decoration image 457. That is, a lettering image 456 along with the additional decoration image 457 input by the consumer in the (5-2)-th user interface 450b may be displayed in the (5-3)-th user interface 450c.

When a process of inputting, by the consumer, the lettering information 454 is completed, the consumer terminal 400a may transmit, to the management server 200, the additional decoration image 457 input by the consumer and information of the lettering image 456. Furthermore, the management server 200 may generate additional decoration model data by analyzing the received additional decoration image 457 and the information of the lettering image 456, and may transmit the additional decoration model data to the consumer terminal 400a.

Referring to FIG. 11, the consumer terminal 400a may display a (6-2)-th user interface 460b in response to the selection of the next page affordance "np" in the (5-3)-th user interface 450c of FIG. 10.

The consumer terminal 400a may receive additional decoration model data from the management server 200 and display the additional decoration model data in the (6-2)-th user interface 460b.

Additional decorations and an additional decoration model 461 for the lettering images 457 and 456, input by the consumer and described with reference to FIG. 10, are displayed in the (6-2)-th user interface 460b.

Furthermore, the consumer terminal 400a may receive primary-decorated cake model data from the management server 200 and display a decorated cake model 463.

The consumer may move the additional decoration model 461, displayed in the (6-2)-th user interface 460b, into the primary-decorated cake model 463 by dragging the additional decoration model 461.

When the location of the main decoration model 441 and the location of the additional decoration model 461 do not overlap within the region of the primary-decorated cake model 463, the consumer terminal 400a may generate location information of the additional decoration model 461 on the primary-decorated cake model 463, and may transmit the location information to the management server 200. Furthermore, the management server 200 may generate secondary-decorated cake model data by composing the additional decoration model and the primary-decorated cake model based on the location information of the additional decoration model 461.

In some embodiments, the (6-2)-th user interface 460b may include a 3D conversion affordance "3da."

The consumer terminal 400a may transmit a 3D conversion request signal to the management server 200 in response to the selection of the 3D conversion affordance "3da." Furthermore, the management server 200 may generate secondary-decorated cake model data in response to the reception of the 3D conversion request signal, and may transmit the secondary-decorated cake model data to the consumer terminal 400a.

The consumer terminal 400a may receive the secondary-decorated cake model data from the management server 200, and may display a secondary-decorated cake model having a 3D form. Furthermore, the consumer terminal 400a may detect a movement direction of an input sliding touch, and may change an angle of the secondary-decorated cake model displayed in accordance with the movement direction. Accordingly, the consumer may view the secondary-decorated cake model at various angles.

The additional decoration model 461 has been illustrated as being placed above the primary-decorated cake model 443, but the present disclosure is not limited thereto. The additional decoration model 461 may be placed at the side of the primary-decorated cake model 443.

In some embodiments, the (6-2)-th user interface 460b may also provide a tool function for adjusting the size or rotation angle of the additional decoration model 461. Accordingly, the consumer may place the additional decoration model 461 on the cake model 463 by adjusting the size or rotation angle of the additional decoration model 461.

When the generation of the secondary-decorated cake model data is completed, the management server 200 may generate food printer model data for an additional decoration model and additional decoration shaping process image data by the food printer.

When generating the additional decoration shaping process image data by the food printer, the management server 200 may generate the additional decoration shaping process image data based on food printer model data for an additional decoration model.

The food printer model data for the additional decoration model may have a STereoLithography (STL) file format, but the present disclosure is not limited thereto.

Illustratively, the extrusion unit of the food printer shapes a decoration model while moving at various directions based on food printer model data for an additional decoration model.

The management server 200 may generate additional decoration shaping process image data by the food printer, that is, virtual image data for shaping a decoration model, as the extrusion unit moves based on the food printer model data for the additional decoration model.

Referring to FIG. 12, the consumer terminal 400a may display a seventh user interface 470 in response to the completion of the generation of the additional decoration shaping process image data.

An additional decoration shaping process image 471 may be played back in the seventh user interface 470.

The additional decoration shaping process image 471 is an image indicating that the food printer shapes additional decorations based on the food printer model data for the additional decoration model. That is, the additional decoration shaping process image relates to a process of shaping additional decorations shaped by the food printer over time.

Specifically, for example, if additional decorations are letters "I Love U" and the food printer shapes the additional decorations in order of "I, L, o, v, e, U", the letters "I, L, o, v, e, U" may be drawn in an image one by one over time. In this case, the image is not an actually photographed image, but is an image of the additional decorations drawn according to a virtual ejection shaping process over time.

The seventh user interface 470 may provide an image time cutting bar 472 for designating a playback point of the additional decoration shaping process image 471 over time. Furthermore, start point affordance "sp" and end point affordance "ep" on the image time cutting bar 472 may move along the image time cutting bar 472.

The consumer may change the locations of the start point affordance "sp" and the end point affordance "ep" on the image time cutting bar 472.

The seventh user interface 470 may include cutting image playback affordance 473.

The consumer terminal 400a may play back a cutting image from location timing of the start point affordance "sp" on the image time cutting bar 472, that is, part of the image 471, to location timing of the end point affordance "ep" in response to the selection of the cutting image playback affordance 473. For example, if the location of the start point affordance "sp" is a point at which the letter L starts to be shaped in the image 471 and the location of the end point affordance "ep" is a point at which the shaping of the letter "e" is terminated in the image 471, an image related to a virtual shaping process for "L, o, v, e" may be played back as illustrated in FIG. 13.

The seventh user interface 470 may include image cutting completion affordance 474.

The consumer terminal 400a may transmit, to the management server 200, location information of the start point affordance "sp" and the end point affordance "ep" on the image time cutting bar 472 in response to the selection of the image cutting completion affordance 474.

The management server 200 may generate photographing timing data and location data of the extrusion unit according to photographing timing, based on the location information of the start point affordance "sp" and the end point affordance "ep" on the image time cutting bar 472.

The consumer terminal 400a may display an eighth user interface 480, such as that illustrated in FIG. 14, in response to the selection of the next page affordance "np" in the seventh user interface 470.

The eighth user interface 480 may display a plurality of pieces of first content 481 received from the management server 200.

In some embodiments, the eighth user interface 480 may provide an environment in which a consumer can directly upload content. Furthermore, the eighth user interface 480 may display at least one piece of second content 482, that is, content directly uploaded by the consumer.

Each of the first content 481 and the second content 482 may be a photo or a video.

The consumer terminal 400a may transmit, to the management server 200, information of first content selected among the plurality of pieces of first content 481.

The management server 200 may extract a cutting image from an additional decoration shaping process image based on location information of the start point affordance "sp" and the end point affordance "ep" on the image time cutting bar 472, and may generate first temporary image note content by composing and editing the cutting image and the first content stored therein.

In some embodiments, the consumer terminal 400a may transmit, to the management server 200, second content selected among the at least one second content 482.

The management server 200 may extract a cutting image from an additional decoration shaping process image based on location information of the start point affordance "sp" and the end point affordance "ep" on the image time cutting bar 472, and may generate second temporary image note content by composing and editing the cutting image and the second content received from the consumer terminal 400a.

Referring to FIG. 15, the consumer terminal 400a may display a ninth user interface 490 for payment and delivery information input.

The consumer may input the payment of a cake order and information on a recipient who will receive the cake, delivery date information, delivery place information, etc. through the ninth user interface 490.

FIGS. 16 and 17 are schematic diagrams of display screens of the recipient terminal. Furthermore, FIG. 18 is a schematic diagram for describing an image note displayed in the recipient terminal.

Referring to FIGS. 16 and 17, when the fabrication of a consumer-customized cake is completed and the cake arrives at a destination, the management server 200 may transmit a cake destination arrival notification message to a recipient.

Specifically, a notification message 401b, including information 402b on a person who has sent the cake product and an image note link 403b, may be displayed in the recipient terminal 400b.

The recipient terminal 400b may display a webpage 404b based on the image note link 403b in response to the selection of the image note link 403b in the notification message 401b.

An image note 405b, such as that illustrated in FIG. 18, may be displayed in a webpage 404b of the recipient terminal 400b. A corresponding image may be played back in order of arrows.

Furthermore, in this case, the image note 405b is first real image note content or second real image note content not the aforementioned first temporary image note content or second temporary image note content. Specifically, the first real image note content is composite content of the first content and an image whose actual shaping process has been photographed. The second real image note content is composite content of the second content and an image whose actual shaping process has been photographed.

The management server 200 may transmit, to the seller server 300, payment and delivery information received from the consumer terminal 400a, primary-decorated cake model data, secondary-decorated cake model data, photographing timing data, location data of the extrusion unit according to the photographing timing, and food printer model data of an additional decoration model.

The seller server 300 may receive the primary-decorated cake model data and display a primary-decorated cake model having a 3D form. Furthermore, the seller server 300 may receive the secondary-decorated cake model data and display a secondary-decorated cake model having a 3D form.

A seller may produce a cake with reference to the displayed primary-decorated cake model having a 3D form and/or the displayed secondary-decorated cake model. The cake directly produced by the seller is a cake to which main decorations have been applied. Furthermore, the seller may complete a real-scale cake to which the main decorations have been applied, and may apply additional decorations to the cake using the food printer 100.

The seller server 300 may transmit, to the food printer 100, the received photographing timing data, location data of the extrusion unit according to the photographing timing, and the food printer model data of the additional decoration model.

Hereinafter, the food printer 100 is described.

FIG. 19 is a perspective view illustrating the structure of an extrusion unit positioned in the food printer. Furthermore, FIG. 20 illustrates part of the extrusion unit for describing the rotation of an extrusion cover.

Referring to FIGS. 1A, 1B and 19, the food printer 100 includes a casing 101 for applying additional decorations to a cake, that is, providing a 3D food fabrication task space, an extrusion unit 200a positioned within the casing 101 to extrude food ingredients, a base plate 120 positioned within the casing 101 and having food ingredients dispensed therefrom, a movement unit 140 for moving the base plate 120 in X-axis, Y-axis and Z-axis directions, and a controller 130 for supplying power to the components constituting the 3D food printer 100 or controlling operations of the components. Although not illustrated in detail, reference numeral 110 is an entrance unit through which a worker (or user) on the outside checks a process of producing 3D food or puts or takes out produced 3D food. Reference numeral 150 is a display unit for displaying information provided to a user in a process of producing 3D food. Furthermore, the entrance unit 110 may be made of a transparent material so that the inside of the casing 101 can be seen, but the present disclosure is not limited thereto. Furthermore, a door device is provided in the entrance unit 110, so that a user can open the door and discharge a capsule on the extrusion unit and couple a new capsule to the extrusion unit.

The casing 101 has been illustrated as having a rectangular parallelepiped structure including an internal space, but the present invention is not limited thereto. A form of the casing may be variously modified depending on an environment in which the food printer 100 is used or the needs of a consumer. The base plate 120 positioned within the casing 101 may move in the three-axis directions in response to a movement of the movement unit 140 when food is fabricated using a 3D food printing method as described above. The movement unit 140 may move in the X-axis, Y-axis and Z-axis directions, which are orthogonal to each other, with respect to the extruder 250 of the extrusion unit 200a. However, in some cases, in the state in which the base plate 120 has been fixed, a 3D food printing process may be performed as the extruder 250 of the extrusion unit 200a moves in the X-axis, Y-axis and Z-axis directions. In another aspect, the base plate 120 may move in at least any one of the X-axis, Y-axis and Z-axis directions. As the extruder 250 may move in the remaining directions, food can be freely shaped in the X-axis, Y-axis and Z-axis directions in response to a movement of the base plate 120 and the extruder 250.

Furthermore, although not illustrated, cooling means may be positioned in the support bar of the movement unit 140 that supports the base plate 120. That is, when a material having viscosity at a given temperature is provided through the extruder 250, the material can be rapidly cooled using the cooling means in the base plate 120.

The controller 130 controls an operation of the food printer 100. Although not illustrated, the controller 130 may include a processor, a memory, a communication unit, a location setting unit, a power supply unit, etc.

The food printer 100 may shape additional decorations on a cake using food printer model data of an additional decoration model provided by the seller server 300 or the management server 200.

The display unit 150 may display information on the location of a cake, location movement guide information for the cake, information on conditions within the casing in an additional decoration shaping process, information on materials for additional decorations, temperature information, location information, shaping time information, information on photographing, etc. In some embodiments, the display unit 150 may provide a touch input region in which information can be input in order to control the food printer 100.

The food printer 100 includes the extrusion unit 200a for processing food ingredients in a form having viscosity and extruding the food ingredients on the base plate 120 based on provided information on the food fabrication. In an embodiment, food ingredients for producing additional decoration-related food in the food printer 100 are not limited, but chocolate which can be easily shaped and mixed and can implement 3D printing may be used. Accordingly, in the following description, an example in which the food printer 100 shapes additional decorations using chocolate is described.

The extrusion unit 200a disposed in the food printer 100 may include the extruder 250 for converting chocolate into a liquid having viscosity and extruding the liquid on the base plate 120 and a transfer unit 280 for up and down moving the extruder 250 in a direction perpendicular to the base plate 120.

The extruder 250 includes an extrusion cover 251, a capsule 256 inserted into the extrusion cover 251 and coupled to the extrusion cover 251, a piston unit 252 inserted into the capsule 256 to transfer pressure chocolate in a viscous state, a heating unit 255 positioned at the bottom of the extrusion cover 251 to heat chocolate, magnetic force provision means 254 positioned in the extrusion cover 251 to separate the extrusion cover 251 and the capsule 256, and a fixing support unit 253 having one side fixed to the magnetic force provision means 254 and the other side fixed to the transfer unit 280.

A plurality of nozzle holes NH (refer to FIG. 25) is formed in the outside of the heating unit 255. A nozzle 277 (refer to 27) coupled to the capsule 256 is drawn to the outside through the nozzle holes NH.

Referring to FIGS. 19 and 20, a rotation unit 600 may be provided at the end of the fixing support unit 253.

A rotation unit 600 may be coupled to the extrusion cover 251. Specifically, the rotation unit 600 may be positioned in a form that surrounds some region of the circumference of the lower side of the extrusion cover 251, and may be coupled to both sides of the extrusion cover 251.

The extrusion cover 251 may rotate within a given angle range "a" in the state in which the extrusion cover has been coupled to the rotation unit 600.

Specifically, the extrusion cover 251 may rotate within the angle range "a" between a first virtual axis parallel to a surface of the ground and a second virtual axis perpendicular to the first virtual axis on the basis of the first and second virtual axes in the state in which the extrusion cover has been coupled to the rotation unit 600.

The capsule 256 may be separated from the extrusion cover 251 by releasing magnetic coupling between the piston unit 252 within the capsule 256 and magnetic force provision means 500 and then rotating the extrusion cover 251 in a direction "a1" (toward the entrance unit 110 in FIG. 1A). Furthermore, the capsule 256 is inserted into the extrusion cover 251 in the state in which the extrusion cover 251 has moved in the direction "a1", and the piston unit 252 of the capsule 256 is coupled to the magnetic force provision means 500 by magnetic coupling in the state in which the extrusion cover 251 has been moved in a direction "a2" (in a direction toward the back of the casing 101 in FIG. 1A) opposite the direction "a1." Accordingly, the capsule 256 is placed at a home position "cp", and finally the extrusion cover 251 may be placed at the home position "cp."

More specifically, when the capsule 256 is separated from the extrusion cover 251, the extrusion cover 251 may be positioned within an angle range "b." When the capsule 256 is inserted into the extrusion cover 251 and the extrusion cover 251 is moved in the direction "a2", the extrusion cover 251 may be positioned within an angle range "c." Thereafter, the capsule 256 is naturally placed at the home position "cp" by magnetic attraction between the piston unit 252 and the magnetic force provision means 500.

As described above, the capsule 256 can be easily separated from and coupled to the extrusion cover 251, and the extrusion cover 251 not at the home position can be naturally placed at the home position "cp" using magnetic coupling.

Furthermore, when a user inserts the capsule 256 into the extrusion cover 251, moves the extrusion cover 251 in the direction "a2", and then slightly lifts up the capsule 256, the piston unit 252 is magnetically coupled to the magnetic force provision means 500 by magnetic attraction between the piston unit 252 and the magnetic force provision means 500, so that the extrusion cover 251 is placed at the home position "cp." Furthermore, in order to magnetically couple the piston unit 252 to the magnetic force provision means 500, when the top end of the piston unit 252 is inserted into the magnetic force provision means 500, a collision sound is generated due to a soft collision between the top end of the piston unit 252 and the inside of the magnetic force provision means 500. Accordingly, a user can be provided with sound feedback that makes the user recognize that the extrusion cover 251 has been placed at the home position "cp."

FIGS. 21 and 22 are perspective views illustrating an extrusion driving unit positioned in the extrusion unit of the food printer. Furthermore, FIGS. 23 and 24 are perspective views illustrating a connection structure for the extrusion driving unit and motor of the food printer.

Referring to FIGS. 21 to 24, the transfer unit 280 includes a transfer guide 281 in which a transfer frame 284 can move, a transfer gear unit 282 positioned within the transfer guide 281 to move the transfer frame 284 in a vertical direction, a power frame 283 coupled to the transfer frame 284, a first motor 288 and a second motor 289 disposed in the power frame 283 to transmit power to the transfer frame 284, and the magnetic force provision means 500 positioned at the bottom of the transfer guide 281 to separate and couple the capsule 256 and extrusion cover 251 of the extruder 250.

More specifically, an extension unit 284a, extended from the transfer frame 284, and the power frame 283 are fixed. A first rotation unit 270a of the first motor 288 is coupled to a second rotation unit 270b of the transfer frame 284 by a power belt 271, so that a rotation power of the first motor 288 is transferred to the second rotation unit 270b of the transfer frame 284.

Furthermore, guide grooves 232 may be formed in the sidewalls of the transfer guide 281 so that the transfer frame 284 and the power frame 283 can smoothly move up and down. The transfer gear unit 282 has one side fixed to the top of the transfer guide 281. A first fixing plate 282a and a first magnetic unit 282b for fixing with the piston unit 252 of the extruder 250 are disposed on the other side of the transfer gear unit 282. The first magnetic unit 282b may be configured with a plurality of magnetic bodies on the first fixing plate 282a. This is for fixing with a second magnetic unit 252d positioned on the second fixing plate 252c of the piston unit 252 by a magnetic force. Furthermore, the first magnetic unit 282b and the second magnetic unit 252d perform a rotator function for the magnetic force provision means 500 to separate and couple the capsule 256 and the extrusion cover 251.

Accordingly, although not illustrated, a rotation ring, such as bearings, may be positioned between the transfer gear unit 282 and the first fixing plate 282a to enable the first fixing plate 282a and the first magnetic unit 282b are rotated independently of the transfer gear unit 282.

Furthermore, when the transfer frame 284 moves up and down, the power frame 283 fixed with the transfer frame 284 also moves up and down. First location sensing means 297 and second location sensing means 298 are disposed above and below the transfer frame 284. Accordingly, when the transfer frame 284 is positioned on the upper side of the transfer guide 281, the first location sensing means 297 may stop an upward movement.

Likewise, when the transfer frame 284 is positioned on the lower side of the transfer guide 281, the second location sensing means 297 may stop a downward movement.

Illustratively, each of the first and second location sensing means 297 and 298 may be configured in a switch form. When the transfer frame 284 reaches a predetermined location on the upper side of the transfer guide 281 or the transfer frame 284 reaches a predetermined location on the lower side of the transfer guide 281, the switch of the first location sensing means 297 or the second location sensing means 298 may be turned on to stop a movement of the transfer frame 284.

FIG. 25 is a perspective view illustrating a coupling structure for the extrusion driving unit and extruder of the food printer. Furthermore, FIG. 26 is a view for explaining the magnetic coupling between a piston unit on a capsule and a magnetic force provision means in order to separate the capsule on a extrusion cover. Furthermore, FIG. 27 is a diagram for explaining a fastening relationship between a piston unit, a capsule, and a nozzle unit in extruder of the food printer. FIG. 28 is a diagram for describing the coupling of the extruder and the extrusion cover and a coupling relation between the extruder and the transfer unit.

Referring to FIGS. 25 to 28, the piston unit 252 positioned in the extruder 250 includes a shaft 252a having a bar form, a packing unit 252b positioned on one side of the shaft 252a, a second fixing plate 252c positioned on the other side of the shaft 252a, and the second magnetic unit 252d positioned on the second fixing plate 252c. The packing unit 252b positioned on one side of the shaft 252a is inserted into the capsule 256 and functions to transfer pressure to chocolate in the liquid state. Furthermore, the food printer 100 includes the second fixing plate 252c and the second magnetic unit 252d positioned on one side of the piston unit 252 in order to align the piston unit 252 of the extruder 250 with the transfer unit 280 and fix thereto.

The second magnetic unit 252d functions to rotate the capsule 256 along with the first magnetic unit 282b as described above, and also functions to fix the piston unit 252 to the transfer unit 280 by a magnetic force without a separate alignment process when fixing the piston unit 252 to the transfer unit 280.

The second fixing plate 252c and the second magnetic unit 252d disposed on the other side of the piston unit 252 are fixed to the first magnetic unit 282b positioned on the first fixing plate 282a of the transfer unit 280. That is, a magnetism fixing method is used to enable the extruder 250 to be easily detached from the transfer unit 280.

In the food printer 100, the second magnetic unit 252d configured with a plurality of magnetic bodies is positioned on the second fixing plate 252c of the extruder 250. The plurality of magnetic bodies constituting the second magnetic unit 252d may be disposed to correspond to the magnetic bodies constituting the first magnetic unit 282b, respectively.

In the food printer 100, when power of the first motor 288 is transmitted to the second rotation unit 270b through the power belt 171, the transfer frame 284 moves up and down along the transfer gear unit 282. Accordingly, as the transfer frame 284 moves, the piston unit 252 of the extruder 250 coupled to the transfer frame 284 moves up and down and dispenses food ingredients in the capsule 256 in the form of a cake. As described above, when the piston unit 252 moves up and down, a 3D food printing task is performed in a way that the packing unit 252b applies pressure to chocolate filled into the capsule 256.

In this case, the capsule 256 includes a body unit 256b, a nozzle coupling unit 256a positioned at the front of the body unit 256b, and a capsule coupling unit 256c positioned at the top of the body unit 256b. The body unit 256b has a cylindrical structure whose inside is empty and is a space with which chocolate in the liquid state is filled. The nozzle coupling unit 256a is fixed to the nozzle 277 for extruding or dispensing, on the base plate 120, chocolate in the liquid state.

Furthermore, the capsule coupling unit 256c for fixing with the extrusion cover 251 is formed at the top of the capsule 256. The capsule 256 has the piston unit 252 inserted therein and fixed thereto by a given force from the packing unit 252b of the piston unit 252, and is fixed to the extrusion cover 251 by the rotation of the piston unit 252. That is, screw threads may be formed in the capsule coupling unit 256c of the capsule 256 and the inside of the extrusion cover 251, corresponding to the capsule coupling unit 256c, so that the capsule coupling unit 256c and the inside of the extrusion cover 251 are coupled by the screw threads.

In some embodiments, a user may directly rotate the capsule 256 so that the capsule coupling unit 256c and the inside of the extrusion cover 251, corresponding to the capsule coupling unit 256c, are screwed and coupled and thus the capsule 256 is inserted and fixed to the extrusion cover 251. Furthermore, a user may directly rotate the capsule 256 in an opposite direction so that screw coupling between the capsule coupling unit 256c and the inside of the extrusion cover 251, corresponding to the capsule coupling unit 256c, is released and thus the capsule 256 becomes a form to be separated from the extrusion cover 251. In this case, in an embodiment, the magnetic force provision means 500 for separating and coupling between the capsule 256 and the extrusion cover 251 may be omitted. However, in order to automate coupling or separation between the capsule 256 and the extrusion cover 251, in particular, the magnetic force provision means 500 is positioned in the food printer 100 in order to automatically rotate the capsule 256 and to couple the capsule 256 and the extrusion cover 251 without a worker's or user's coupling task.

The magnetic force provision means 500 includes a stator 352 having the second magnetic unit 252d and the first magnetic unit 282b disposed in the piston unit 252 as rotators and positioned along the circumference of the first and second magnetic units 282b and 252d in order to rotate the first and second magnetic units 282b and 252d, a protrusion units 353 disposed at given intervals on the inner surface of the stator 352, and a coil 353a positioned in each of the protrusion units 353. In the magnetic force provision means 500 positioned in the food printer 100, the magnetic bodies constituting the second magnetic unit 252d are disposed in plural in a fan-shaped form on the basis of the center of the stator 352. The second magnetic unit 252d is configured with a plurality of magnetic bodies, which is disposed at given intervals so that adjacent magnetic bodies are separated. A form and number of the magnetic bodies constituting the first magnetic unit 282b may be set so that the magnetic bodies correspond to the magnetic bodies constituting the second magnetic unit 252d.

The plurality of coils 353a is spaced apart and disposed on the inner surface of the stator 352 facing the second magnetic unit 252d. The second magnetic unit 252d is rotated in a given direction by a magnetic line of force generated by the coils 353a. As described above, when the second magnetic unit 252d is rotated, the piston unit 252 coupled to the second magnetic unit 252d is rotated, so that the capsule 256 can be fixed to or separated from the extrusion cover 251.

Furthermore, the piston unit 252 is inserted into the capsule 256 of the food printer 100, and the nozzle 277 is fixed to the nozzle coupling unit 256a on the other side.

The packing unit 252b of the piston unit 252 is fixed to the inside of the capsule 256. The packing unit 252b is not fully fixed so that it can transfer pressure to liquefied chocolate of the capsule 256. However, the packing unit 252b and the capsule 256 need to maintain the fixing state if a given force is not applied thereto. Accordingly, the capsule 256 and the packing unit 252b are fixed by a given force in the region in which the packing unit 252b is located. Accordingly, only by the rotation of the piston unit 252, the screw threads formed in the capsule coupling unit 256c of the capsule 256 and the screw threads formed on the inner surface of the extrusion cover 251 can be coupled and separated.

Referring to FIGS. 1A, 1B and 25, a camera device 290 may be installed at the bottom of the extrusion cover 251, that is, on the outside of the heating unit 255.

The controller 130 of the food printer 100 may detect location information of a cake before it starts shaping after the cake is inserted into the casing 101. Specifically, the controller 130 may photograph the top of the cake on the base plate 120 by controlling the camera device 290. Furthermore, the controller 130 may detect location information of the cake by analyzing a photographed image. Furthermore, the controller 130 may determine whether the cake is located in a region in which the cake can be shaped based on received primary-decorated cake model data and current location information of the cake. If the cake is not located in the region in which the cake can be shaped, the controller 130 may display location information of the cake and location movement guide information of the cake through the display unit 150. A user may move the location of the cake with reference to the location movement guide information of the cake on the display unit 150.

Additional decorations need to be shaped on the cake to which main decorations have been applied through the food printer 100. That is, the region in which the additional decorations are shaped has been previously determined as a specific region of the cake. Accordingly, in an embodiment, a user may place the cake in the region in which the additional decorations can be shaped with reference to location movement guide information of the cake.

When the shaping of additional decorations is started by the food printer 100, the controller 130 may photograph a shaping process by driving the camera device 290 for a specific time section based on received photographing timing data and location data of the extrusion unit according to photographing timing. Furthermore, when the shaping is completed, the controller 130 may transmit, to the management server 200, the photographed image data directly or through the seller server 300.

The management server 200 may receive image data whose actual shaping process has been photographed, and may generate the first real image note content or the second real image note content composed with the first content or the second content.

The aforementioned embodiments according to the present disclosure may be implemented in the form of a program readable through various computer means, and may be written in a computer-readable recording medium. In this case, the computer-readable recording medium may include program instructions, a data file, and a data structure alone or in combination. The program instructions written in the computer-readable recording medium may be specially designed and constructed for the present disclosure, or may be known and available to those skilled in computer software. For example, the computer-readable recording medium include magnetic media such as a hard disk, a floppy disk and a magnetic tape, optical media such as a CD-ROM and a DVD, magneto-optical media such as a floptical disk, and hardware devices specially configured to store and execute program instructions, such as a ROM, a RAM, and a flash memory. Examples of the program instructions may include not only a machine language wire constructed by a compiler, but a high-level language wire capable of being executed by a computer using an interpreter. Such a hardware device may be configured to act as one or more software modules in order to perform an operation of the present disclosure, and vice versa.

Specific executions described in the present disclosure are embodiments and are not intended to limit the scope of the present disclosure in any method. For the simplicity of the specification, the writing of conventional electronic components, control systems, software and other functional sides of the systems may be omitted. Furthermore, the connections or connection members of the lines between the components shown in the drawings illustrate functional connections and/or physical or circuit connections. In an actual device, the connections or connection members may be substituted or may be indicated as additional various functional connections, physical connections or circuit connections. Furthermore, a component may not be a component essentially necessary for the application of the present disclosure unless a detailed reference, such as "essential" or "importantly", is given.

Furthermore, although the present disclosure has been described in the detailed description of the present disclosure with reference to the embodiments of the present disclosure, those skilled in the art or a person having ordinary knowledge in the art will appreciate that the present disclosure may be modified and changed in various ways without departing from the spirit and technical area of the present disclosure written in the claims to be described later. Accordingly, the technological scope of the present disclosure is not limited to the contents described in the detailed description of the specification, but should be determined by the claims.

An embodiment can provide the method and system capable of additionally apply a personalized design on a cake having a ready-made form.

An embodiment can provide the method and system for producing, ordering, and delivering a consumer-customized cake using the food printer.

An embodiment can provide the method and system for producing, ordering and delivering a cake using the food printer capable of photographing a shaping process.

An embodiment can provide the system which enables a photographed image of a shaping process to be used as a piece of content for a gift.

An embodiment can provide the method and system for producing, ordering and delivering a cake using the food printer in which the rotation means is positioned between the piston unit for fixing the capsule and the transfer unit and the extrusion cover and the capsule can be automatically separated and coupled.

An embodiment can provide the method and system for producing, ordering and delivering a cake, which can rapidly produce a large amount of cakes in a manner that components constituting the 3D food printer are systematically performed without a manual task of a worker and food ingredients for the decorations of a cake can be rapidly supplied and exchanged.

An embodiment can provide the method and system capable of accurately shaping, on a cake, additional decorations designed by a consumer by detecting current location information of the cake to which main decorations have been applied.

What is claimed is:

1. A method of producing, ordering, and delivering a consumer-customized cake using a food printer capable of photographing a printout, the method comprising:
   transmitting, by a terminal, a cake image selected among a plurality of displayed cake images to a management server;
   transmitting, to the management server, a decorated cake image selected among a plurality of displayed decorated cake images;
   receiving, from the management server, a plain cake model matched with the selected cake image and a main decoration model matched with the selected decorated cake image and displaying the plain cake model and the main decoration model;
   placing the main decoration model on the plain cake model in response to selection for a movement of the main decoration model and transmitting, to the management server, location information of the main decoration model on the plain cake model;
   receiving, from the management server, a primary decoration cake model which is a composite model of the plain cake model and the main decoration model based on the location information of the main decoration model on the plain cake model;
   placing an additional decoration model on the displayed primary decoration cake model in response to selection for a movement of the displayed additional decoration model and transmitting, to the management server, location information of the additional decoration model on the primary decoration cake model;
   receiving, from the management server, a secondary decoration cake model which is a composite model of the primary decoration cake model and the additional decoration model based on the location information of the additional decoration model on the primary decoration cake model;
   shaping additional decorations on a cake by the food printer that receives food printer model data for the additional decoration model;
   receiving, from the management server, a shaping process image of the additional decoration model and displaying the shaping process image;
   transmitting, to the management server, information on a start point and end point of the shaping process image so that a camera device of the food printer photographs a shaping process when the food printer shapes the additional decorations on the cake based on the start point and the end point; and
   receiving delivery information to which the cake on which the additional decorations have been shaped by the food printer is to be reached, and transmitting the delivery information to the management server,
   wherein,
   the food printer includes an extruder extruding a liquid having viscosity, a transfer unit for up and down moving the extruder, a rotation unit for rotating the extruder, a magnetic force provision means disposed at the transfer unit for separating or coupling the extruder and the transfer unit,
   the shaping additional decorations on a cake includes forming the additional decorations on the cake while the extruder of the food printer moves on the cake,
   the extruder comprises an extrusion cover, a capsule inserted in the extrusion cover, and a piston unit inserted in the capsule,
   the magnetic force provision means is disposed at a bottom side of the transfer unit, and the piston unit is coupled with the bottom side of the transfer unit by a magnetic force of the magnetic force provision means,
   the rotation unit is coupled to the extrusion cover in a form that surrounds some region of a circumference of a lower side of the extrusion cover, and
   the extrusion cover is capable of rotating at a predetermined angle based on fixed areas of the rotation unit and the extrusion cover to separate the capsule from the extrusion cover.

2. The method of claim 1, further comprising:
   transmitting the photographed image captured by the camera device of the food printer to a cake recipient on the delivery information.

3. The method of claim 1, further comprising:
   providing a tool for input of an additional decoration image;
   transmitting, to the management server, an additional decoration image input through the tool; and
   displaying the additional decoration model generated by the management server based on the additional decoration image.

4. The method of claim 2, further comprising providing a tool for input of content,
   wherein content input through the tool is transmitted to the management server so that composed content of the content and a photographed image of the food printer, composed by the management server, is transmitted to the cake recipient.

5. The method of claim 2, wherein the shaping process image of the additional decoration model is a virtual shaping process image of the additional decoration model generated based on the food printer model data.

6. The method of claim 3, wherein the tool for the input of the additional decoration image is a tool for text input and/or drawing input.

* * * * *